(12) United States Patent
Brutsche et al.

(10) Patent No.: US 12,175,549 B2
(45) Date of Patent: *Dec. 24, 2024

(54) RECOMMENDATION ENGINE FOR TESTING CONDITIONS BASED ON EVALUATION OF TEST ENTITY SCORES

(71) Applicant: NCS Pearson, Inc., Bloomington, MN (US)

(72) Inventors: Joseph Brutsche, Bloomington, MN (US); Darrick Jensen, Minneapolis, MN (US); Michael Nealis, St. Charles, IL (US); Peter Pascale, Edina, MN (US); Vladan Pulec, Shakopee, MN (US)

(73) Assignee: NCS PEARSON, INC., Bloomington, MN (US)

( * ) Notice: Subject to any disclaimer, the term of this patent is extended or adjusted under 35 U.S.C. 154(b) by 493 days.

This patent is subject to a terminal disclaimer.

(21) Appl. No.: 16/941,378

(22) Filed: Jul. 28, 2020

(65) Prior Publication Data
US 2022/0036489 A1    Feb. 3, 2022

(51) Int. Cl.
*G06Q 50/20*    (2012.01)
*G06N 20/00*    (2019.01)
(Continued)

(52) U.S. Cl.
CPC ........... *G06Q 50/205* (2013.01); *G06N 20/00* (2019.01); *G06Q 10/0635* (2013.01); *G06Q 50/20* (2013.01); *G09B 7/02* (2013.01)

(58) Field of Classification Search
CPC ...................................................... G09B 7/00
See application file for complete search history.

(56) References Cited

U.S. PATENT DOCUMENTS

| 7,945,952 B1 | 5/2011 | Behforooz |
| 10,885,802 B2 | 1/2021 | Gleim et al. |

(Continued)

OTHER PUBLICATIONS

M. Ghizlane, B. Hicham and F. H. Reda, "A New Model of Automatic and Continuous Online Exam Monitoring," 2019 International Conference on Systems of Collaboration Big Data, Internet of Things & Security (SysCoBIoTS), Casablanca, Morocco, 2019, pp. 1-5, doi: 10.1109/SysCoBIoTS48768.2019.9028027 (Year: 2019).*

(Continued)

*Primary Examiner* — Lynda Jasmin
*Assistant Examiner* — Ehrin L Pratt
(74) *Attorney, Agent, or Firm* — Quarles & Brady LLP

(57) ABSTRACT

Systems and methods may involve processing of entity data by machine learning models to produce one or more entity and/aggregate risk scores and/or aggregate anticipated risk scores, which may be compared to one or more thresholds to determine when one or more predefined actions should be taken. The entity data may be collected for various entities related to an exam registration and delivery process, which may include a candidate, an exam, a test center, an exam registration event, a proctor, and an exam delivery event. The exam registration and delivery process may include multiple states—each being associated with a different set of entities. Aggregate risk scores for a given state may be calculated using only entity data for the set of entities associated with that state. The predetermined actions taken may also be dependent on the current state.

20 Claims, 9 Drawing Sheets

(51) Int. Cl.
*G06Q 10/0635* (2023.01)
*G09B 7/02* (2006.01)

(56) References Cited

U.S. PATENT DOCUMENTS

| | | |
|---|---|---|
| 11,075,942 B2 | 7/2021 | Mei et al. |
| 2007/0048723 A1 | 3/2007 | Brewer et al. |
| 2011/0244440 A1 | 10/2011 | Saxon et al. |
| 2013/0262357 A1 | 10/2013 | Amarasingham et al. |
| 2014/0240507 A1* | 8/2014 | Hsu .................. H04N 7/185 |
| | | 348/143 |
| 2014/0272882 A1 | 9/2014 | Kaufman et al. |
| 2015/0213722 A1 | 7/2015 | Nypl |
| 2015/0269857 A1 | 9/2015 | Feng |
| 2015/0279372 A1 | 10/2015 | Papierman et al. |
| 2015/0317337 A1 | 11/2015 | Edgar |
| 2016/0055327 A1 | 2/2016 | Moran et al. |
| 2016/0182542 A1 | 6/2016 | Staniford |
| 2016/0335906 A1 | 11/2016 | Foster et al. |
| 2017/0068792 A1 | 3/2017 | Reiner |
| 2017/0364832 A1 | 12/2017 | Habermehl et al. |
| 2018/0131518 A1 | 5/2018 | Scicchitano et al. |
| 2018/0357559 A1* | 12/2018 | Truong ................... G06N 20/00 |
| 2019/0087558 A1 | 3/2019 | Mercury et al. |
| 2019/0156689 A1 | 5/2019 | Jaeh et al. |
| 2019/0196888 A1 | 6/2019 | Anderson et al. |
| 2019/0197443 A1* | 6/2019 | Anderson ................ H04N 7/18 |
| 2019/0197911 A1 | 6/2019 | Anderson et al. |
| 2019/0280986 A1 | 9/2019 | Anderson |
| 2019/0325770 A1* | 10/2019 | Foster ...................... G09B 7/00 |
| 2020/0111188 A1 | 4/2020 | McCallum et al. |
| 2020/0302296 A1 | 9/2020 | Miller |

OTHER PUBLICATIONS

International Search Report and Written Opinion, International Application No. PCT/US2021/043533, Nov. 2, 2021.
International Search Report and Written Opinion, International Application No. PCT/US2021/043536, Nov. 2, 2021.
International Search Report and Written Opinion, International Patent Application PCT/US2021/043540, Jan. 31, 2022.
Extended European Search Report and Written Opinion, European Patent Application No. 21925061.0, Jun. 20, 2024.

* cited by examiner

RECOMMENDATION ENGINE FOR TESTING CONDITIONS BASED ON EVALUATION OF TEST ENTITY SCORES

FIELD OF THE INVENTION

This disclosure relates to the field of systems and methods configured to implement electronic platforms for testing services configured to establish a secure, proctored environment.

BACKGROUND OF THE INVENTION

Online and testing center-based candidate evaluation approaches provide convenience and efficiency. But such systems may be the target of individuals or organizations attempting to circumvent measures implemented to prevent cheating or the collection of sample questions. Accordingly, there is a need for systems and methods to monitor activity occurring in such online and testing center-based candidate evaluation systems to identify or otherwise anticipate transactions or participating entities that warrant further investigation.

The features and advantages of the present invention will be better understood from the following detailed description taken in conjunction with the accompanying drawings.

SUMMARY

Figure 1A:
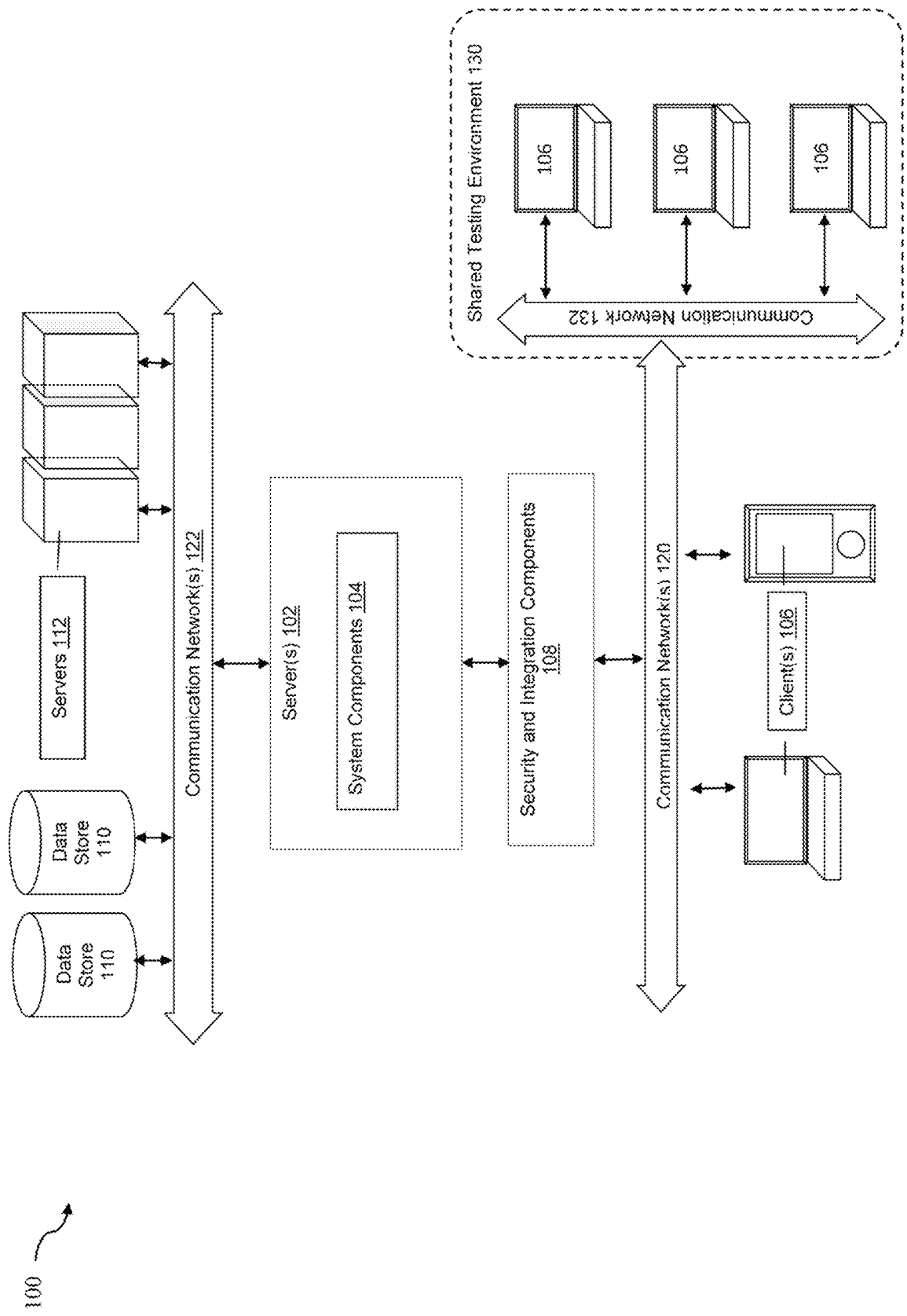
FIGS. 1A and 1B are system level block diagrams for an example embodiment of a distributed computing environment implementing a proctored examination platform in accordance with the present disclosure.

In an example embodiment, a system, may include a data store server, a model server, and a resource management server. The data store server may include a candidate data store that includes candidate data corresponding to a candidate, a test center data store that includes test center data corresponding to a test center, an exam data store that includes exam data corresponding to an exam, an exam registration event data store that includes exam registration event data related to an exam registration event during which the candidate registered to take the exam at the test center, a proctor data store that includes proctor data corresponding to a proctor, and an exam delivery event data store that includes exam delivery event data related to an exam delivery event during which the candidate has taken the exam at the test center, exam delivery event being supervised by the proctor, and the exam delivery event data being periodically updated during the exam delivery event, wherein the candidate, the exam, the test center, the exam registration event, the proctor, and the exam delivery event are each associated with an exam registration and delivery process. The model server may be connected to the data store server via an electronic communication network, and may include multiple machine learning models including a candidate machine learning model, a test center machine learning model, an exam machine learning model, an exam registration event machine learning model, an exam delivery event machine learning model, a proctor machine learning model, a country machine learning model, and an aggregate machine learning model. The resource management server may include a resource management processor and being connected to the data store server and the model server via the electronic communication network. The resource management processor may execute computer-readable instructions for receiving an electronic notification defining a state of the exam registration and delivery process, determining, based on the electronic notification, that the state is a real-time exam delivery event state, identifying the candidate, the test center, the exam, the exam registration event, the proctor, and the exam delivery event as being associated with the exam registration and delivery process in the real-time exam delivery event state in response to determining that the state is a real-time exam delivery event state, causing the model server to retrieve the candidate data, the test center data, the exam data, the exam registration event data, and the proctor data from the data store server, causing the model server to periodically retrieve the exam delivery event data from the data store server as the exam delivery event data is updated during the exam delivery event, causing the candidate machine learning model of the model server to generate a candidate risk score based on the candidate data, causing the test center machine learning model of the model server to generate a test center risk score based on the test center data, causing the exam machine learning model of the model server to generate an exam risk score based on the exam data, causing the exam registration event machine learning model of the model server to generate an exam registration event risk score based on the exam registration event data, causing the exam delivery event machine learning model of the model server to periodically generate an exam delivery event risk score based on the exam delivery event data, such that the exam delivery event risk score is updated as the exam delivery event data is updated, causing the proctor machine learning model of the model server to generate a proctor risk score based on the proctor data, causing the country machine learning model of the model server to generate country risk score based on at least a portion of the candidate data and at least a portion of the test center data, causing the aggregate machine learning model of the model server to periodically generate an aggregate risk score based on inputs including the candidate risk score, the exam registration event risk score, the test center risk score, the exam risk score, the exam delivery event risk score, the proctor risk score, and the country risk score, such that the aggregate risk score is updated as the exam delivery event risk score is updated, periodically receiving the aggregate risk score from the model server during the exam delivery event, determining that the aggregate risk score exceeds a predetermined threshold, and modifying a database entry during the exam delivery event, in response to determining that the aggregate risk score exceeds the predetermined threshold, to cause a live video feed of the exam delivery event to be sent to the proctor.

In some embodiments, the resource management processor may execute computer-readable instructions for performing a predefined action in response to determining that the aggregate risk score exceeds the predetermined threshold. The predefined action may include: modifying a second database entry to initiate an investigation of at least one entity selected from the group consisting of: the exam registration event, the exam delivery event, the test center, the proctor, and the candidate, modifying a third database entry to trigger enhanced identity verification of the candidate to be performed when the exam delivery event ends, modifying a fourth database entry to trigger enhanced monitoring of the candidate during the exam delivery event by activating at least one video recording device, modifying a fifth database entry to prevent the candidate from receiving results of the exam delivery event, and/or modifying a sixth database entry to prematurely end the exam delivery event.

In some embodiments, the inputs may further include auxiliary data retrieved from the data store server, where the auxiliary data includes: the candidate data, the exam registration event data, the test center data, the exam data, the exam delivery event data, and/or the proctor data.

In some embodiments, each of the multiple machine learning models of the model server may include a respective neural network.

In an example embodiment, a data store server may include multiple data stores, a model server, and a resource management server. The multiple data stores may store entity data corresponding to multiple entities associated with an exam registration and delivery process, the entity data including exam registration event data corresponding to an exam registration event during which a candidate registers for an exam to be taken at a test center. The exam registration event data may be periodically updated during the exam registration event. The model server may include a model memory storing multiple entity machine learning models and an aggregate machine learning model. The resource management server may include a resource management processor configured to execute computer-readable instructions for determining that the exam registration and delivery process is in a real-time exam registration event state, identifying relevant entity data of the entity data, the relevant entity data corresponding to the exam registration and delivery process in the real-time exam registration event state, and the relevant entity data including the registration event data, causing the model server to retrieve the relevant entity data from the data store server, wherein the registration event data of the entity data is retrieved by the model server periodically upon being updated, causing the multiple entity machine learning models of the model server to generate entity risk scores for each of the relevant entities based on the relevant entity data, the entity risk scores including an exam registration event risk score that is periodically updated as the exam registration event data is periodically updated, causing the aggregate machine learning model of the model server to periodically generate an aggregate risk score during the exam registration event, the aggregate risk score being generated based on the entity risk scores, periodically receiving the aggregate risk score from the model server while the exam registration and delivery process is in the real-time exam registration event state, determining that the aggregate risk score exceeds a predetermined threshold, and modifying a database entry during the exam registration event, in response to determining that the aggregate risk score exceeds the predetermined threshold, to trigger a requirement for enhanced identity verification of the candidate at an exam delivery event scheduled during the exam registration event.

In some embodiments, the multiple entities may include the candidate, the exam, the test center, the exam registration event, a proctor, and the exam delivery event during which the exam is delivered to the candidate under supervision of the proctor.

In some embodiments, the entity data may include candidate data associated with the candidate and including candidate data elements which may include: a name of the candidate, an e-mail address of the candidate, an internet protocol (IP) address of a device of the candidate, a bot behavior indicator associated with the IP address of the device, a historical fraudulent behavior indicator associated with the candidate, an account takeover risk indicator determined based on activity of a user profile associated with the candidate, and/or an exam registration history associated with the candidate.

In some embodiments, the entity data may include exam data associated with the exam and including exam data elements, which may include: an exam type of the exam, a stakes rating for the exam, an item bank size of the exam, an item bank age of the exam, and/or web monitoring results indicative of whether content of the exam has been published online.

In some embodiments, the entity data may include test center data associated with the test center and including test center data elements, which may include: a test center name, a test center country, a test center IP address, a test center geolocation determined based on the test center IP address, an exam registration history for the test center, a facility type of the test center, an age of the test center, a software update compliance indicator, at least one exam result pattern indicator, at least one registration pattern indicator, a geolocation mismatch indicator, and/or a number of test centers located within a predefined radius of the test center.

In some embodiments, the exam registration event data may include exam registration event data element, which may include: a scheduled exam date, a scheduled exam time, an exam registration event time, payment information, a number of days that exam registration occurred prior to the scheduled exam date, a simultaneous exam registration indicator, a cross-industry indicator defining whether a first industry to which the exam that the candidate is registering is related is different from a second industry associated with an exam registration history of the candidate, a financial fraud indicator determined based on the payment information, one or more unusual frequency indicators defining whether the candidate has repeatedly performed one or more exam registration activities at a frequency exceeding a predetermined frequency threshold, and/or an authorization indicator defining whether the candidate has been authorized to register for the exam by a third-party.

In some embodiments, the entity data may include proctor data associated with the proctor and including proctor data elements, which may include: an employment type indicator defining whether the proctor is an employee of the test center or a contractor, a total number of exams supervised by the proctor, years for which the proctor has been supervising exam delivery, employment history of the proctor, proctor fraud history defining whether the proctor is associated with previous incidents of fraud, certification status of the proctor, and/or certification exam results of the proctor.

In some embodiments, the entity data may include exam delivery event data associated with the exam delivery event and including exam delivery data elements selected from the group consisting of: individual exam performance data of the candidate, biometric data provided by the candidate at the exam delivery event, one or more candidate behavior indicators obtained during the exam delivery event, object detection data obtained during the exam delivery event, and/or video of the candidate during the exam delivery event.

In some embodiments, the resource management processor may execute computer-readable instructions for performing, in response to determining that the aggregate risk score exceeds the predetermined threshold. The at least one predefined action may include: modifying a second database entry to trigger video monitoring of the candidate during the exam delivery event, modifying a third database entry to block an internet protocol (IP) address associated with the candidate from accessing the system, and/or modifying a fourth database entry to trigger an investigation of the candidate by sending an investigation notification to a computer device of associated with a human investigator, the investigation notification identifying at least the candidate and the exam registration event.

In an example embodiment, a method may include steps for receiving, by a processor of a resource management server, a notification defining a state of an exam registration and delivery process, identifying, by the processor, entities related to the state of the exam registration and delivery process, instructing, by the processor, a model server communicatively coupled to the resource management server to perform a risk assessment of the entities, retrieving, by a model server from entity data stores of a data store server, sets of entity data corresponding to the entities, generating, by at least one machine learning model of the model server, at entity risk scores for entities based on the sets of entity data, receiving, by an aggregate machine learning model of the model server, the entity risk scores, generating, by the aggregate machine learning model, an aggregate risk score based on at least the entity risk scores, receiving, by the processor, the aggregate risk score from the model server, determining, by the processor, that the aggregate risk score exceeds a predetermined threshold, and modifying, by the processor, a database entry associated with the state of the exam registration and delivery process, in response to determining that the aggregate risk score exceeds the predetermined threshold, to trigger a fraud investigation of the at least one entity of the entities.

In some embodiments, the method may include a step of for identifying, by the processor, that the state corresponds to a real-time user profile registration event state during which a candidate registers a user profile. The entities include may include the candidate. The entity data may include candidate data associated with the candidate that is updated periodically during the real-time user profile registration event state. The entity risk scores may include a candidate risk score generated based on the candidate data. The at least one entity for which the fraud investigation is triggered may include the candidate. The method may include a step for modifying, by the processor, a second database entry, in response to determining that the aggregate risk score exceeds the predetermined threshold, to trigger at least one predefined action, which may include: blocking an internet protocol (IP) address defined in the candidate data from accessing a system associated with the resource management server, blocking a user profile defined in the candidate data from accessing the system, requiring 2-factor authentication of the user, and/or requiring enhanced identity verification of the candidate.

In some embodiments, the method may include steps for identifying, by the processor, that the state corresponds to a real-time exam registration event state corresponding to an occurrence of an exam registration event in which a candidate registers to take an exam at a test center. The entities may include the candidate, the test center, the exam, and the exam registration event. The entity data may include candidate data associated with the candidate, test center data associated with the test center, a trend data associated with each of a plurality of testing facilities identified within the test center data, exam data associated with the exam, and exam registration event data associated with the exam registration event, the exam registration event data being updated periodically during the exam registration event. The entity risk scores may include a candidate risk score, a test center risk score, an exam risk score, and an exam registration event risk score. The at least one entity for which the fraud investigation is triggered may be selected from the group consisting of: the candidate and the test center. The method may include a step for modifying, by the processor, a second database entry, in response to determining that the aggregate risk score exceeds the predetermined threshold, to trigger at least one predefined action, which may include: blocking an internet protocol (IP) address defined in the candidate data from accessing a system associated with the resource management server, blocking a user profile defined in the candidate data from accessing the system, collecting additional information about the test center to determine whether the test center is facilitating cheating or other unfair or fraudulent practices, denying or revoking a certification for a particular test center, registering an individual to take an exam to collect information about the test center to identify such unfair or fraudulent practices, causing a testing center to be limited in their test administration, or to a particular type of exam category, initiate an investigation by a human investigator of a candidate, an exam, or a test center associated with the exam registration event, requiring 2-factor authentication of the user, and/or requiring enhanced identity verification of the candidate.

In some embodiments, the method may include a step for identifying, by the processor, that the state corresponds to a real-time exam delivery event state corresponding to an occurrence of an exam delivery event in which an exam is delivered to a candidate at a test center under supervision of a proctor, the candidate having previously registered to take the exam during an exam registration event. The entities may include the candidate, the test center, the exam, and the exam registration event, the exam delivery event, and the proctor. The entity data may include candidate data associated with the candidate, test center data associated with the test center, exam data associated with the exam, exam registration event data associated with the exam registration event, proctor data associated with the proctor, and exam delivery event data associated with the exam delivery event, the exam delivery event data being updated periodically during the exam delivery event. The entity risk scores may include a candidate risk score, a test center risk score, an exam risk score, an exam registration event risk score, a proctor risk score, and an exam delivery event risk score. The at least one entity for which the fraud investigation is triggered may be selected from the group consisting of: the candidate, the test center, and the proctor. The method may include a step for modifying, by the processor, a second database entry, in response to determining that the aggregate risk score exceeds the predetermined threshold, to trigger at least one predefined action, which may include: blocking an internet protocol (IP) address defined in the candidate data from accessing a system associated with the resource management server, blocking a user profile defined in the candidate data from accessing the system, requiring 2-factor authentication of the user, and/or requiring enhanced identity verification of the candidate.

In some embodiments, the step of modifying the second database entry may trigger requiring enhanced identity verification of the candidate by requiring that at least one form of identity verification be performed both at a beginning of the exam delivery event and an end of the exam delivery event, the at least one form of identification, which may include: biometric analysis and/or image capture of a face of the candidate.

In some embodiments, the at least one form of identification may include the biometric analysis, and the biometric analysis may include palm vein scanning and recognition.

In some embodiments, the at least one machine learning model and the aggregate machine learning model may include neural networks.

In an example embodiment, the disclosed system may provide recommendations for predefined recommended actions, depending on any combination of anticipated risk scores derived from entering any combination of entity data associated with an anticipated testing activity into the appropriate individual or aggregate models and/or risk score models described in more detail herein.

A data store server may store the plurality of entity data associated with an anticipated testing activity, which may include any of the entity data disclosed herein. As non-limiting examples, this entity data may include exam data, a test center data associated with a test center at which the anticipated testing activity will occur, a candidate data associated with each of a plurality of candidates anticipated to be involved in the anticipated testing activity, a country data, and/or a proctor data. The data store may further include a historical testing data associated with each of the plurality of candidates anticipated to be involved in the anticipated testing activity. In some embodiments, the entity data may be distributed among the data store and multiple data repositories, possibly operated by an administrative entity operating the system, a testing facility, or a trusted third party.

The data store server may further store a machine learning model, a plurality of recommended predefined actions, and a threshold. This threshold may be input and set by a system administrator or other administrator of the exam data. The threshold set by this administrator may represent a desired level of trustworthiness which, if exceeded by the anticipated situational risk score, triggers a recommendation for at least one of the predefined actions.

The disclosed system may further include a server, as described in more detail herein. This server may receive the threshold, possibly as input from the administrator. In response to receiving this threshold, the disclosed system may select the machine learning model and the entity data associated with the anticipated testing activity from the data store.

The disclosed system, possibly the server, may then perform the risk assessment on the selected entity data, which indicates a risk level associated with the anticipated testing activity. The steps for performing the risk assessment may include inputting the entity data, as one or more machine learning parameters, into the machine learning model, and receiving the anticipated situational risk score, which indicates the probability of an anticipated situational risk score during the anticipated testing activity, as output from the machine learning model. The anticipated situational risk score may be associated with and based on one or more metrics derived from the entity data. The machine learning model may be trained via a linear regression analysis or a classification training, as described in more detail herein.

After the machine learning model outputs the anticipated situational risk score, the disclosed system, possibly the server, may compare the anticipated situational risk score to the threshold input by the administrator. If the anticipated situational risk score exceeds the threshold, the disclosed system may update one or more database entries stored in association with the entity data to include one or more recommended predefined actions, which provide a level of trustworthiness at least as high as the threshold.

The entity data may include any data described above, or disclosed in greater detail below. Likewise, the recommended predefined actions may include any of the recommended actions described above, or disclosed in greater detail below.

DETAILED DESCRIPTION

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A "proctored examination" is an evaluation routine, such as a test (e.g., taken by an individual subscribing to an evaluation service, such as a student for a class) that is administered to test-takers in a secure, monitored environment, so as to prevent, deter, catch, or minimize cheating. Commonly, one or more "proctors" secure the environment and administer the test, for example by: validating the test-takers, such as by checking identification; clearing the environment of unnecessary materials; releasing test materials to the test-takers; keeping the test time; monitoring test-takers during the test for erratic behavior; stopping the test when time has elapsed; and collecting and securing completed test materials. The introduction and proliferation of internet-based and other online coursework has posed the challenge of implementing proctored examinations online, when test-takers as well as the proctors themselves are using many different types of computer systems from disparate, physically separated locations to access online testing materials remotely.

The present systems and methods provide innovations to the processes, technical system architecture, security, and user experience of a digital platform for administering examinations.

FIG. 1A illustrates a non-limiting example distributed computing environment 100, which implements the platform of the present disclosure. The distributed computing environment 100 includes one or more computer server computing devices ("servers") 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model, scalable virtual server model, "serverless" virtual machine allocation model, peer-to-peer computing model, or any other distributed computing architecture or combination of architectures.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100. For example, the distributed computing system 100 may implement a content distribution network in which server computing device(s) 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

A client device 106 may be any suitable hardware computing device capable of executing program instructions embodied in the software applications and/or application interfaces operable to provide the platform's functions to the client device 106. Personal desktop, laptop, thin-client, tablet, and similar computers, as well as smartphones and other mobile devices with sufficient computing power and network connectivity, are examples of such hardware computing devices. The client device 106 may further include hardware and associated software components used for certain platform functions. For example, client devices 106 used at least by test-takers, and in some embodiments also those used by proctors and other administrators, may require a webcam or other image capture device that captures images and/or video of the client device 106 user and his immediate surroundings. The client device 106 may include other input/output devices, such as a keyboard and mouse or touchpad, microphone, speakers, and fingerprint or other biometric sensors.

In accordance with FIG. 1A, some of all of the client devices 106 that can access the online proctoring platform (i.e., via communication network 120) may be physically remote from the server 102 as well as from each other. Additionally or alternatively, in some embodiments one or more shared testing environments 130 may be registered on the platform. A shared testing environment may be a physical or virtual environment containing a plurality of co-located client devices 106. For example, the shared testing environment 130 may be associated with a brick-and-mortar testing center that is staffed, in person and/or virtually, with proctors and administrative staff. In some embodiments, "co-located" means the communication devices 106 are configured to communicate over a private network 132, such as a LAN, that is configured to connect to the server 102 (e.g., via the communication network 120); the client devices 106 can further be physically co-located, such as in adjacent cubicles in a testing center.

The client devices 106 of FIG. 1A represent devices used by any type of user to access the platform, which types may include, without limitation: a test-taker having an authorized user account; an agent of the test-taker, such as an aide to a disabled candidate; a new or unregistered user; a proctor having an authorized user account; and administrative staff, such as system administrators, agents of the service provider, testing site managers, greeters, support staff, and the like. Each client device 106 may have unique or additional system requirements and/or configurations depending on the type of user that is using the client device 106 to access the platform.

Various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users. For example, security and integration components 108 may be configured to facilitate identification of the user of a client device 106, such as when a valid testing candidate or a bad actor is attempting to connect to a proctor or to access testing resources. In another example, security and integration components 108 may, directly and/or via the server 102, access data (e.g., stored in back-end servers 112) that has been or can be used to establish a trust score for a platform user, as described further below. As non-limiting examples, these security components 108 may comprise dedicated hardware, specialized networking components, and/or software (e.g., web servers, authentication servers, firewalls, routers, gateways, load balancers, etc.) within one or more data centers in one or more physical locations and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the distributed computing environment 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with the server(s) 102 via one or more networks 122, which may be any suitable communication network as described above with respect to communication network 120. In some embodiments, the network 122 may be contained within a virtual computing environment, and may communicate encrypted information, such as over a TLS-encrypted channel. In some cases, one or more data stores 110 may reside on a non-transitory storage medium within the server 102. In certain embodiments, data stores 110 and back-end servers 112 may reside in a storage-area network (SAN). In some embodiments, back-end servers 112 may include computing components, software applications, virtual machines or other specially allocated computing resources, and the like, which implement particular functions of the online proctoring platform. The server 102 may send data to the back-end servers 112 for processing, and may receive the results of such processing. For example, a back-end server 112 may be configured to perform facial recognition or other image processing for identifying a user; the server 102 may collect images from an imaging device of the client device 106 and send the images to the back-end server 112 for verification that the person depicted in the images is the authenticated user. Access to certain data stores 110 and/or back-end servers 112 may be limited or denied based on the processes, user credentials, and/or devices attempting to access them.

Figure 1B:
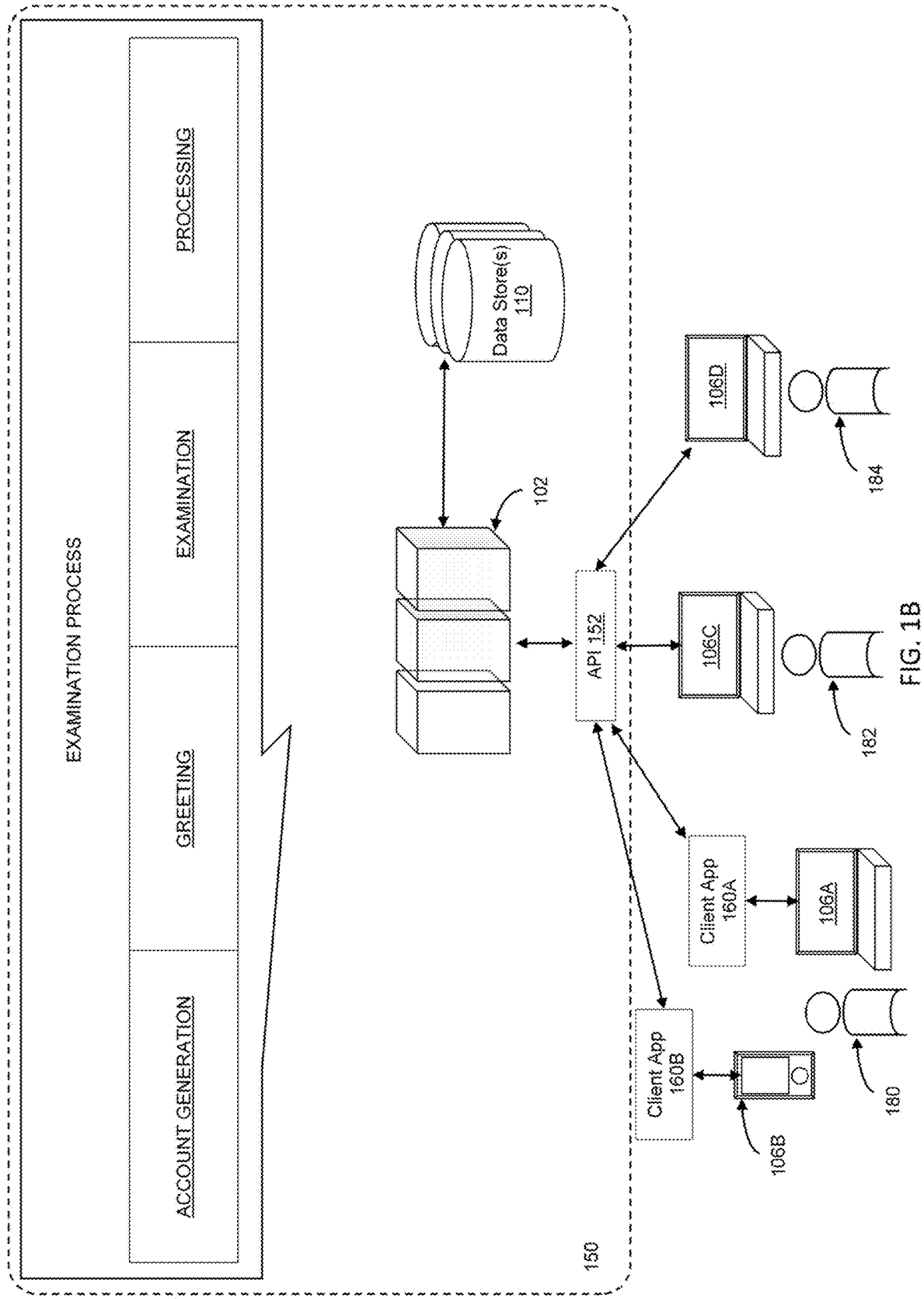

The systems and methods described herein may use, or be implemented on, the computing infrastructure described in FIG. 1A (and computing devices described in FIG. 2) in order to provide a platform having security, content protection, transaction processing, and data analytics features that improve the test-taking experience for both candidates and proctors, the efficiency of the platform, and the validity of the test results, among other improvements. Such features, implemented in computing hardware and/or software, can affect all phases of the examination process; FIG. 1B illustrates the examination process and provides context for the functionality of platform 150.

The phases of the exam registration and delivery process include candidate user account/profile generation/registration, exam registration, exam delivery, and processing of test answers and results (i.e., scoring or post-exam-delivery). In each phase, the platform 150 may confirm the identity and credentials of the candidate user and the candidate user's devices for use within the platform 150. The present platform 150 may additionally calculate trust scores for one or more entities associated with any phase of the examination process. In some embodiments, disclosed in more detail below, the present platform 150 may be configured to calculate one or more individual and/or aggregate anticipated trust scores for any of the phases and/or entities disclosed herein.

In the examination phase, the platform 150 may connect the candidate user to one or more proctors (i.e., the matched proctors from the greeting phase) that monitor the candidate user during the examination. The platform 150 then facilitates the examination, such as by sending exam questions to the candidate user's devices and receiving input answers in return. The present disclosure describes platform 150 functionality for coordinating input and output across multiple candidate devices, continuously verifying the candidate's identity, and observing the candidate and flagging aberrant behavior or actions, during the examination phase. Once the exam is complete, the examination process enters the processing phase, where the platform 150 stores and updates user data, reports the candidate's trust score, and performs analytics on collected data as described below.

FIG. 1B illustrates an example platform 150 implemented in the distributed computing environment of FIG. 1A. The servers 102 may communicate with the data stores 110 and other components of the platform 150 to provide an examination process to users connecting to the platform 150, such as through an application programming interface (API) 152 or another interface facilitating communication between the servers 102 and connecting client devices. A candidate user 180 may access the platform 150 using one or more client devices 106A, B in order to take an exam; a proctor user 182 and an administrative user 184 may access the platform 150 using their respective client devices 106C, 106D.

Some of all of the candidate user's 180 client devices 106A, B may be specially configured to emulate a testing environment. In some embodiments, a client software application 160A, B may be installed and executed on the client device(s) 106A, B when the candidate user 180 logs onto the platform 150 or initiates the examination process. The client software application 160A,B may include software modules that, among other functions: disable other software programs; take exclusive control of network interfaces, and disable communication functionality that is unnecessary for communicating with the platform to reduce the likelihood of unauthorized communications; establish a secure communication channel with the platform; and, enable and take exclusive control of the client device's components and peripherals for capturing audio and video (to produce the candidate user's video feed and prevent unauthorized recordings), playing back audio, and collecting biometric data. The platform software thus secures control of the client device to an extent that secures the examination process.

Figure 2:
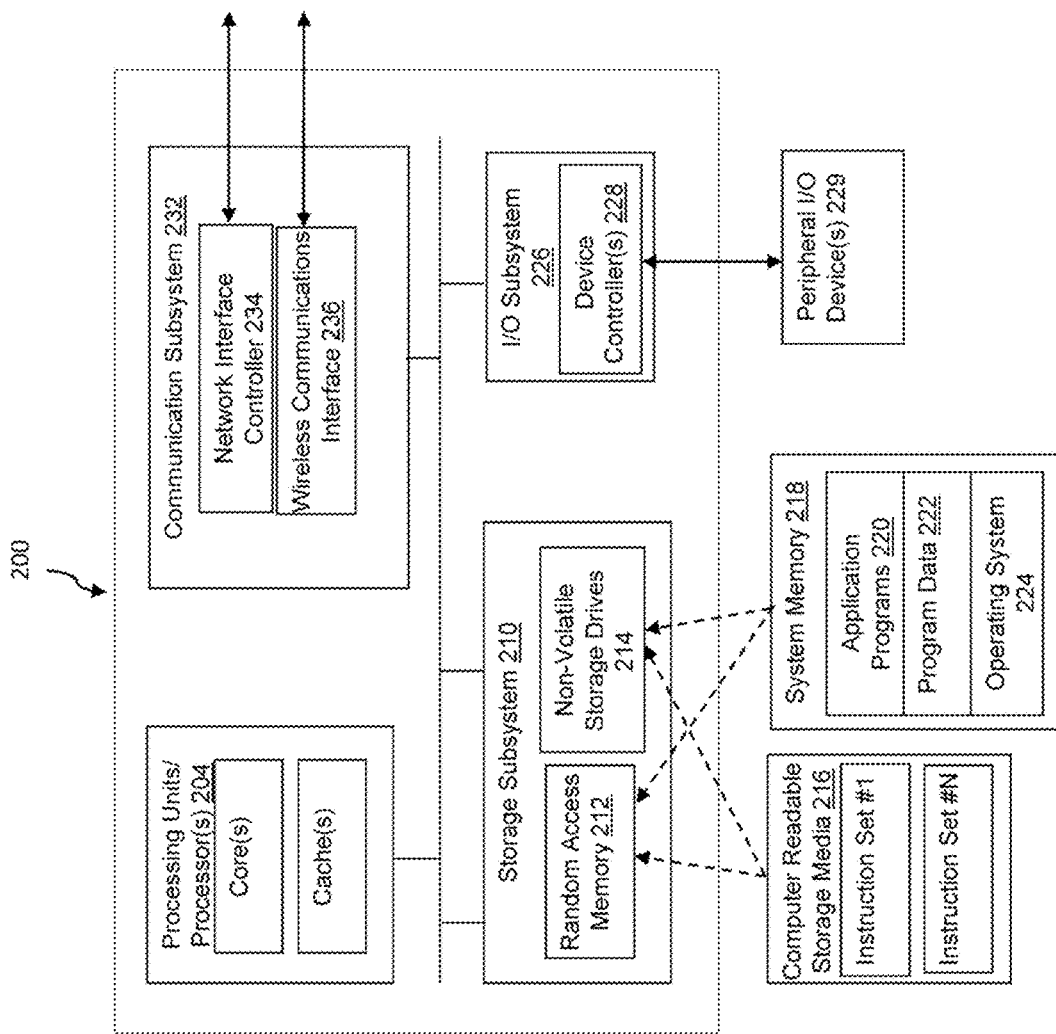
FIG. 2 is a system level block diagram for an example computing device in a proctored examination platform in accordance with the present disclosure.

With reference now to FIG. 2, a block diagram of an illustrative computer system 200 is shown. The computer system 200 may correspond to any of the computing devices or servers of the distributed computing environment 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processing units 204 may execute a variety of resident software processes embodied in program code, and may maintain multiple concurrently executing programs or processes. Processing units 204 may include specially-configured CPUs as well as one or more specialized processors, (e.g., digital signal processors (DSPs), outboard, graphics application-specific (e.g., GPUs), and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices 229 which are attachable/detachable from the computer system 200. Input may include signal input such as keystroke or mouse input, audio input (e.g., spoken commands), video input (e.g., from a webcam), motion sensing, gesture recognition (e.g., eye gestures), etc. As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216. System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc. System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204. System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer-readable storage media 216 may store the basic programming and data constructs that provide the functionality of some embodiments. Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210. Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 232 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

The present systems and methods may employ security approaches that verify user identities and credentials, connecting computer devices (e.g., client devices 106 of FIG. 1A), data input into the platform, and the like. In particular, the present system enables the platform to conduct a more comprehensive analysis of risk and/or anticipated risk (e.g., cheating risk or identity or intellectual property theft risks, or other fraud risks) posed by a user based upon a combination of "internal" and "external" risk factors. This risk analysis can be used by the platform throughout the examination process; in addition, data collected during the examination process can inform the risk analysis of a particular user. The platform may, in some embodiments, generate a trust score representing the results of this risk analysis as described below.

Figure 3:
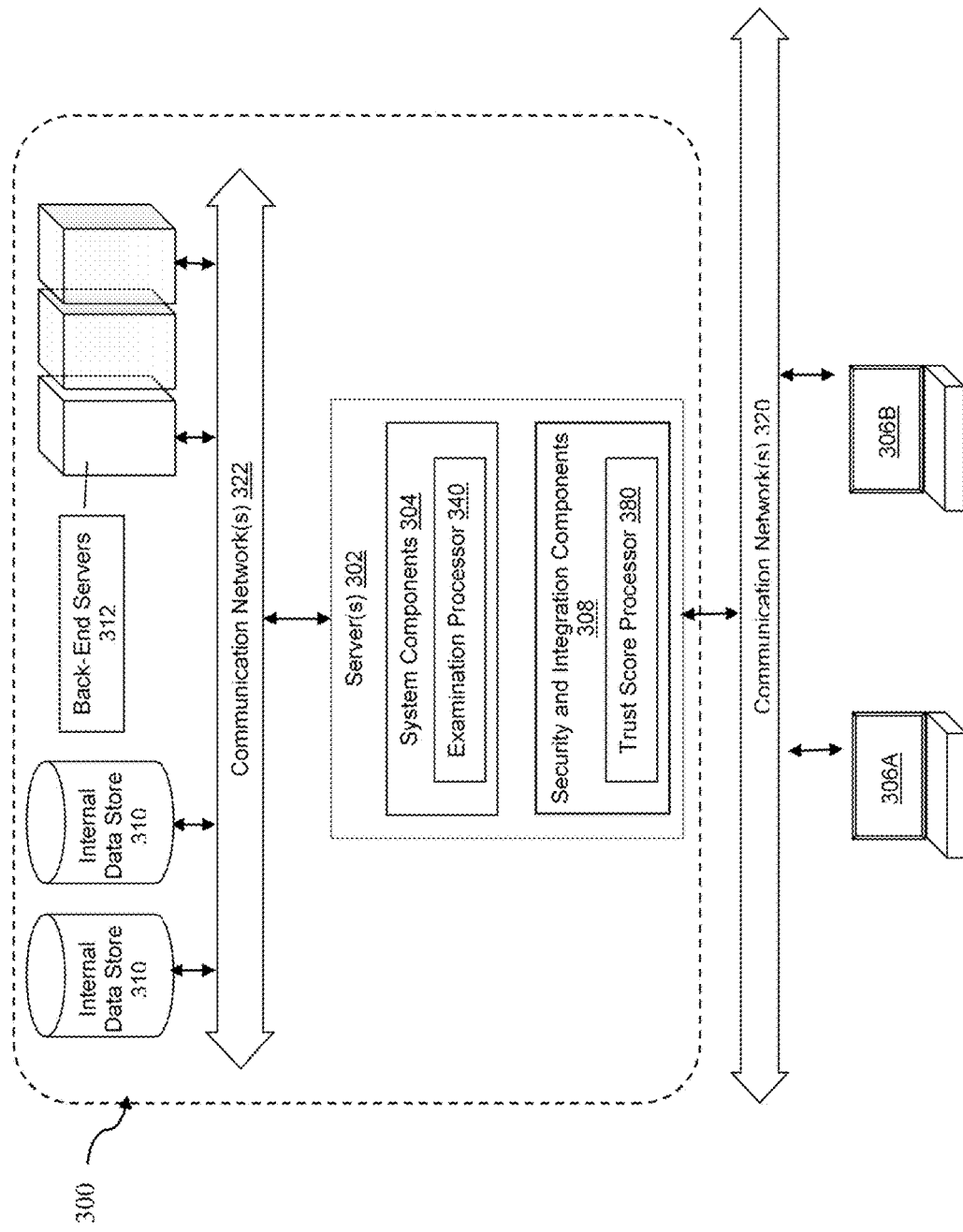
FIG. 3 is a system level block diagram of another example embodiment of a proctored examination platform that generates trust scores for users, in accordance with the present disclosure.

FIG. 3 depicts an example distributed computing environment, such as the environment 100 of FIG. 1A, in which an examination platform 300 is implemented by one or more servers 302 having system components 304, one or more internal data stores 310 residing on the servers 302 or accessible by the servers 302 via a communication network 322, and one or more back-end servers 312 in communication with the servers 302 via the communication network 322, each operating as described above with respect to FIG. 1A. The system components 304 may include an examination processor 340 that controls and executes the examination process for one or more users connected to the platform 300. The examination processor 340 or another of the system components 304 may communicate with a security and integration system 308 having security and integration components as described above. In one embodiment, the security and integration system 308 may be implemented (e.g., on one or more servers) in the distributed computing environment but outside of the platform 300; the security and integration system 308 may be used by multiple systems including the platform 300 and other testing systems. In another embodiment, the security and integration system 308 may be implemented within the platform 300, its components and functionality provided in dedicated or distributed fashion on the server 302, the back-end server(s) 312, or another hardware computing device of the platform 300. The server 302 may use communication network 322 and/or other networks to communicate with the security and integration system 308 (e.g., via in API). In one embodiment, the security and integration system 308 may include a trust score processor 380. The trust score processor 380 acquires data related to the internal and external factors of the risk analysis, computes trust scores and/or anticipated trust scores based on one or more algorithms for evaluating the risk posed by a candidate, one or more anticipated candidates anticipated to be involved in an anticipated testing activity, a proctor, or another platform user, and stores the trust scores and/or anticipated trust scores or delivers them to other system components 304 that use them.

One or more of the internal data stores 310 and/or one or more of the back-end servers 312 may store data internal to the platform that the trust score processor 380 obtains, such as by querying the relevant computing devices or by receiving the data from the server 302. Non-limiting examples of internal data that the platform may generate and store in the internal data stores 310 and/or the back-end servers 312 include user account information, historical candidate data describing a candidate user's past performance on examinations and/or past analysis of the user's behavior, historical proctor data describing a proctor user's past performance, historical data relating to examinations, such as aggregated test results and other parameters, previously-calculated trust scores, platform performance parameters such as number and frequency of users, and other platform-generated data. One or more of the back-end servers 312 may be configured to perform various desirable forms of analysis of platform-generated data to produce internal data relevant to the trust score and/or the anticipated trust score. For example, a back-end server 312 may have executable program instructions for obtaining aggregate completed examination data and using the data to determine usage patterns of completed examinations and identify, as internal data, frequencies at which certain examinations are taken together by the same candidate user.

Figure 4:
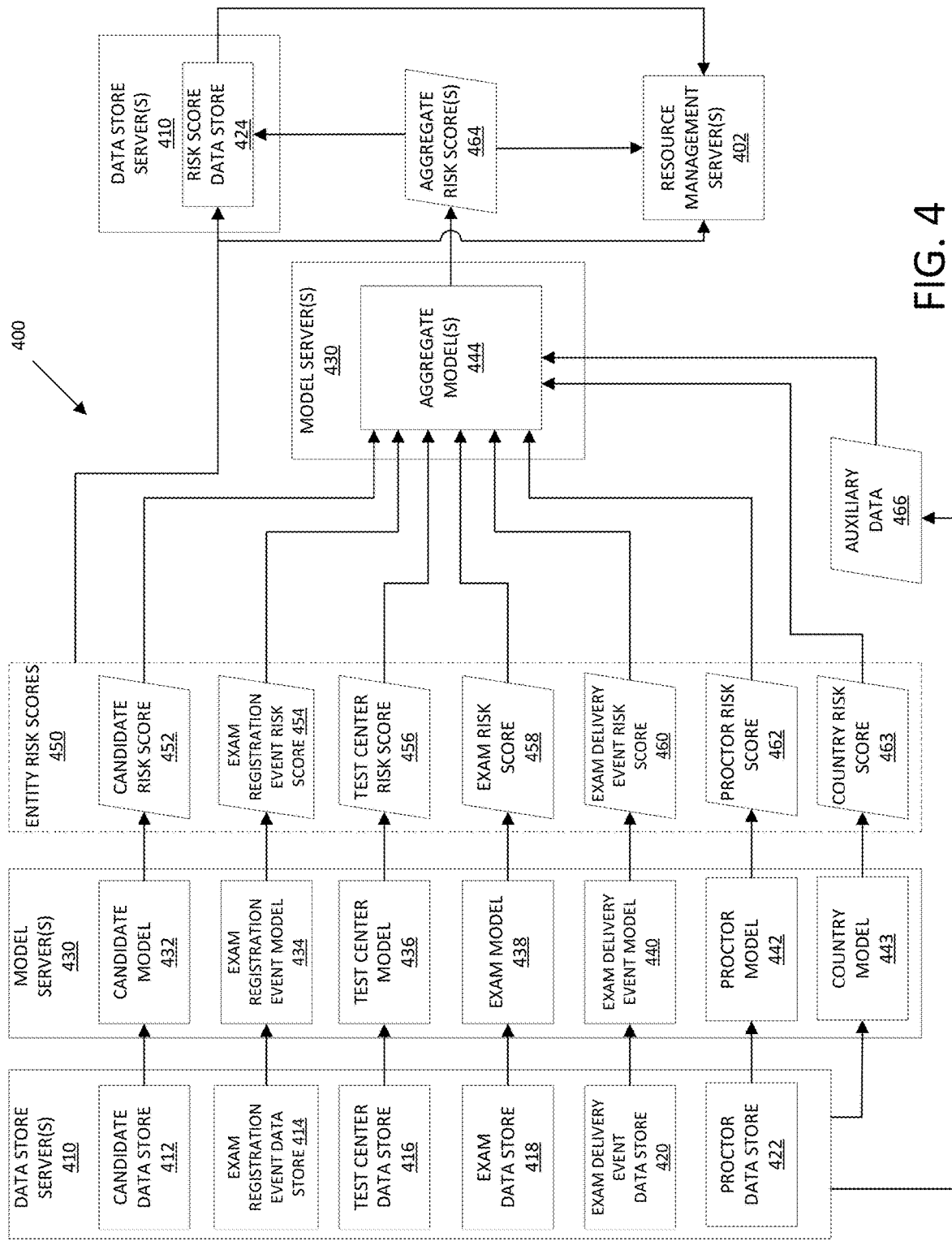
FIG. 4 is a system level block diagram of another example embodiment of a proctored examination platform that generates one or more risk scores and/or aggregate risk scores based on metrics corresponding to examination-related entities, in accordance with the present disclosure.

Referring to FIG. 4, a block diagram of a system 400 is shown, which may generate risk scores and/or anticipated risk scores based on metrics corresponding to examination-related entities. For example, an overall exam registration and delivery process in which a candidate registers for and takes a proctored exam may involve a number of primary entities, such as an anticipated testing activity, the candidate, a candidate anticipated to be involved in the anticipated testing activity, the exam, the exam registration event during which the candidate registers for the exam, the test center at which the candidate registers to take the exam, a test center at which the anticipated testing activity will occur, the exam delivery event during which the exam is administered to the candidate at the test center, the proctor who observes and manages the administration of the exam, the country of residence of the candidate ("candidate country"), and the country in which the test center is located ("test center country").

For example, a given test center and/or test center at which an anticipated testing activity will occur may be associated with one or many different candidates, anticipated candidates, exams, exam registration events, exam delivery events, trend data associated with testing facilities, and/or proctors. A given candidate may be associated with one or many different exam registration events, exams (e.g., both exams the candidate has taken in the past and exams the candidate is presently registered to take), exam deliveries, text centers, and/or proctors. A given exam may be associated with a one or many different candidates, exam registration events, test centers, exam delivery events, and proctors. A given proctor may be associated with one or many different candidates, test centers, exams, and exam delivery events. A given exam registration event may be associated with a single candidate registering for a single exam at a single test center. A given exam delivery event may be associated with a single exam being administered to a single client at a single test center.

Metrics may be defined for each of these examination-related entities and/or anticipated testing activities, and these metrics may be analyzed (e.g., via the application of artificial intelligence/trained machine learning algorithms) to estimate a risk level, anticipated risk level, anticipated risk score, and/or "risk score" associated with the entity to which the metrics correspond. For example, each entity type (e.g., candidate, anticipated candidate, exam registration event, test center, trend data for facilities identified within the test center data, test center at which an anticipated testing activity will occur, exam, exam delivery event, proctor, candidate country, test center country) a unique set of metrics may be defined for that entity type (e.g., unique compared to the sets of metrics defined for other entity types). Examples of unique metric sets for the various entities are provided below.

As used herein, a "risk score" and/or an "anticipated risk score" may generally refer to a quantification of an estimate of risk of some type of anomalous behavior and/or an anticipated risk of some type of anticipated anomalous behavior based on existing data (e.g., cheating on the exam, financial fraud when paying for the exam, replacement of the candidate with a proxy test-taker, etc., and/or any anticipated instances of these events) or theft (e.g., intellectual property theft, exam data leakage, etc.) occurring and/or anticipated to occur in connection with some aspect of a candidate and/or anticipated candidate registering for and taking an exam. Individual risk scores and/or anticipated risk scores (sometimes referred herein to as "entity risk scores") may be generated for each examination-related entity (or pair of entities in the case of candidate country and test center country entities) and, in some embodiments, an aggregate risk score for a specific evaluation event may be generated based on the individual risk scores, and/or an anticipated aggregate risk score for a specific anticipated testing activity may be generated based on the individual anticipated risk scores. The system 400 may take one or more predefined actions based on the individual and/or aggregate risk scores. For example, predefined actions may be taken by the system 400 in response to determining that one or more of the individual and/or aggregate risk scores has exceeded one or more predetermined thresholds defined for that/those risk score(s), which may indicate an elevated level of risk. In some embodiments, the predefined actions that are taken when a risk score exceeds a predetermined threshold may depend on the entity type associated with that risk score (e.g., different responsive actions may be defined for a high candidate risk score compared to those defined for a high test center risk score). Examples of predefined actions that may be taken in response to the determination that one or more risk scores have exceeded one or more corresponding thresholds are provided below.

Similarly, the disclosed system 400 may also recommend one or more recommended actions based on one or more anticipated individual and/or aggregate risk scores. For example, recommendations for predefined actions may be generated by the system 400 in response to determining that one or more individual and/or aggregated anticipated risk scores exceed a threshold. This threshold may be received from a system or other administrator associated with an anticipated testing activity, and the recommended predefined action, which may be stored in the database and/or system logic in association with the entity data, may provide a level of trustworthiness at least as high as the threshold.

The system 400 may include one or more data store servers 410 (e.g., servers 112, FIG. 1A), one or more model servers 430, and one or more resource management servers 402. The data store servers 410, the model servers 430, and the resource management servers 402 may be connected to one another via one or more electronic communication networks (e.g., networks 120, 122, 320, 322 of FIGS. 1A, 3). The data store servers 410 may include a candidate data store 412, an exam registration event data store 414, a test center data store 416, an exam data store 418, an exam delivery event data store 420, a proctor data store 422, and a risk score data store 424. The model servers 430 may include a candidate model 432, an exam registration event model 434, a test center model 436, an exam model 438, an exam delivery event model 440, a proctor model 442, a country model 443, and an aggregate model 444. The models 432-443 may be statistical models or machine learning models, which may include linear regression models, artificial neural networks, support vector machine regression models, random forest models, Naïve Bayes models, AdaBoost models, Boosting Tree models, or other applicable models. The resource management servers 402 may include one or more resource management processors, and may control operation of the data store servers 410 and/or the model servers 430 (e.g., via communication over the one or more electronic communication networks).

In the example of neural networks, a neural network model may include various components configured to generate and manage artificial neural network data structures used to perform decision-making and/or predictive analyses based on entity data received by the neural network (e.g., from data stores 412-422). Such neural network data structures may be designed, constructed, and trained by adaptive learning processes to analyze complex sets of inputs (e.g., one or more sets of entity data, which may include candidate, anticipated candidate, exam registration event, test center, anticipated test center, exam, exam delivery event, and/or proctor data, and/or one or more outputs (e.g., risk scores and/or anticipated risk scores) generated by other machine learning models) and provide predictive outputs corresponding to the overall expected level of risk and/or anticipated level of risk associated with the entity or group of entities corresponding to the entity data input to the neural network model.

In order to register for an exam, a candidate may generally be required to create a digital user profile. The process of creating this digital user profile is referred to herein as a "user profile registration event," and may be considered part of a larger exam registration and delivery process. This user profile may be stored in a user profile data store of the data store servers 410. It should be noted that the descriptions of a candidate, candidate data, and/or candidate risk scores described herein may further be applied to any candidate associated with an anticipated testing activity, identified according to a historical testing data associated with each of a plurality of candidates stored within the data store. The candidate's user profile may, for example, include identifying information about the candidate, such as the candidate's name, country of residence, and e-mail address. This identifying information may be included in candidate data, and/or anticipated candidate data based on actual anticipated candidates that already exist within the system 400 and associated with historical testing information or data stored in the candidate data store 412, the candidate data being associated with the candidate, anticipated candidate, and/or the candidate's user profile. The data store servers 410 or, in some embodiments, another server of the system 400 (e.g., resource management servers 402) may automatically retrieve and/or determine additional candidate data (e.g., from relevant data stores that may be included in or otherwise coupled to the system 400 and/or the data store servers 410) related to the candidate subsequent to the creation and storage of the candidate's user profile.

For example, the candidate data may further include: one or more IP addresses used by the candidate (e.g., to create the user profile, to register for exams, and/or to take online exams, the geographic location of the computer used by the candidate (e.g., determined via IP geolocation), the candidate's registration history, the candidate's course and/or exam histories, the candidate's social media activity/presence, and/or results of a background check performed for the candidate. It should be understood that, in some embodiments, the candidate data collected for a given candidate may be limited according to privacy laws and/or permission provided by the candidate, defining what information can be collected about the candidate.

In embodiments where an anticipated risk score is generated in association with an anticipated testing activity, the calculation of the anticipated risk score may include an anticipated candidate data set. This additional data may define an anticipated class of candidates, and for each class of candidates may further include, as non-limiting examples, an anticipated age range, one or more anticipated countries of origin, and one or more anticipated backgrounds for anticipated candidates likely to be involved in the anticipated testing event.

In some embodiments, determining the candidate's IP geolocation may involve identifying an IP address of the device that was used or that is being used by the candidate to register the user profile, providing the IP address to an IP geolocation module (e.g., which may be included in the resource management servers 402, or which may be hosted on another server or group of servers coupled to the resource management server 402), and receiving location information associated with the IP address from the IP geolocation module after the IP geolocation has processed the IP addressed.

The candidate data may further include a bot behavior indicator, which may be asserted when the system determines that the candidate and/or one or more of the candidate's IP addresses have been associated with network-based attacks (e.g., bot attacks, distributed denial of service (DDOS) attacks, teardrop attacks, etc.) against the system 400 or associated systems and/or associated with "bot behavior" (e.g., harvesting seat availability, artificially consuming seat availability, running automatic scripts, etc.). In some embodiments, a bot behavior data store may be included in the data store server(s) 410, in which IP addresses associated with historically observed bot behavior are stored. For example, if an IP address is determined, along with multiple other IP addresses, to be the source of multiple repeated pings or other data packets sent to the system 400 in a short time period, that IP address may be added to the bot behavior data store, and the entry of the data store for that IP address may include the designation "DDOS attack". For example, if an IP address is determined to be the source of a series of fragmented packets sent to the system 400, that IP address may be added to the bot behavior data store, and the entry of the data store for that IP address may include the designation "teardrop attack".

The candidate data may further include a historical attack indicator, which may be asserted when the system determines that the user profile of the candidate or one or more IP addresses associated with the candidate have been previously identified as being involved with attacks (e.g., bot attacks, distributed denial of service (DDOS) attacks, teardrop attacks, hacking attempts, etc.) against the system 400 or associated systems (e.g., systems of test centers associated with the system 400).

The candidate data may further include one or more historical anomalous behavior indicators representing any known past anomalous behavior exhibited by the candidate (e.g., if the candidate has previously been caught or is presently under investigation for: fraudulently taking an exam on behalf of another person, cheating on an exam, taking exams in order to commit intellectual property theft and/or leak exam data, etc.).

The candidate data may further include a candidate ID-level, defining which level of identification the candidate has provided. For example, if the candidate has only provided a picture of a driver's license to verify their identity, their candidate ID-level may be associated with higher risk than a candidate than that of a candidate who has had their identity verified by more trusted methods, such as providing multiple forms of ID (e.g., a combination of driver's license, birth certificate, passport, etc.), in-person identity verification, fingerprinting, biometric analysis, or the like.

The candidate data may further include an account takeover risk indicator, which may be determined based on one or more of the following factors: whether the candidates geolocated IP address changes more frequently than a predetermined threshold, whether the candidate's provided country of residence does not match their geolocated IP address, whether the candidate's country of residence does not match the country of the test center at which the candidate is attempting to register or has already registered to take an exam, whether a distance between the candidate's location (as determined from the geolocated IP address) and the location of the test center exceeds a predetermined threshold distance, whether the candidate's password changes frequently (e.g., above a predetermined threshold), whether the candidate's user account has been dormant (e.g., unused for more than a predetermined threshold period of time) but new activity is detected, whether the login frequency to the candidate's user profile is too high (e.g., above a predetermined threshold), and/or whether too many unsuccessful login attempts to the candidate's user profile have been made. For example, the value of the account takeover risk indicator may increase for each of the above factors that are determined to be true. In some embodiments, the account takeover risk indicator may instead be a binary value that is set to one if more than a predetermined threshold number of the above factors are determined to be true, and zero otherwise, or vice-versa. In some embodiments, the account takeover risk indicator may be a vector, with each element of the vector representing a respective one of the above factors.

The candidate data may further include the candidate's exam registration history, which may include a record of all exams that the candidate has registered for, instances in which the candidate did not show up to take an exam for which they registered, and/or a record of exams failed by the candidate.

In some embodiments, the candidate data may include a conspicuous exam registration history indicator. The conspicuous exam registration history indicator may represent whether the candidate has historically registered for exams at times that are considered "conspicuous". For example, the content of some exams may be updated periodically as a matter of course, which may aid in keeping exams relevant to progress in their associated fields and/or may aid in preventing content of the exams from becoming widely known to potential candidates (e.g., via distribution by former test-takers). The system may identify that a candidate frequently or exclusively searches and/or registers for exams that have recently (e.g., on the same day or within a week or month) been updated to include new content. In response, the conspicuous exam registration history indicator for that candidate may be set to a predefined value representing that the candidate's historical registration activity corresponds to predefined "conspicuous" behavior.

The candidate's social media activity and/or other online activity associated with the candidate may be included in the candidate data. For example, social media posts and/or other online publications made by the candidate may be determined (e.g., based on keyword analysis or other linguistic analysis techniques) to be related to an exam delivery event associated with the candidate (e.g., that the candidate has taken or is scheduled to take). Such posts and publications may affect the candidate risk score 452. For example, the candidate's social media activity may include a number of social media accounts associated with the candidate, which may contribute to confirming the candidate's identity (e.g., there being multiple social media accounts associated with the candidate may help to confirm a candidate's identity and lower risk, while there being no social media accounts associated with the candidate may not confirm or refute the candidate's identity).

As attempts at cheating or other undesirable behavior may sometimes involve the use of multiple user accounts/profiles, multiple factors may be analyzed (alone or in combination) when determining whether a candidate is associated with behavior that should be flagged. For example, in some embodiments, some or all of the elements of the candidate data described above may be determined based on observed activity associated with any or all of: the candidate's user account, the IP address of the client device that the candidate is using to access the system, and personal information associated with the candidate (e.g., the candidate's phone number, e-mail address, name, payment information, driver's license number, etc.).

The candidate model 432 may be a trained machine learning model, such as a neural network model, for example. For a given candidate, the candidate model 432 may retrieve and process candidate data corresponding to the given candidate from the candidate data store 412 in order to generate the candidate risk score and/or an anticipated candidate risk score 452. In some embodiments, the candidate risk score and/or the anticipated candidate risk score 452 may be sent from the candidate model 432 to be processed by the resource management server(s) 402 and/or one or more aggregate models 444, and/or to be stored in the risk score data store 424.

When a candidate registers to take an exam (e.g., confirming the exam date, time, and test center, at which to take the exam and/or payment method and information for payment of exam fees), exam registration event data related to the exam registration event may be collected by the system 400. For example, exam registration event data corresponding to the exam registration event may be stored in the exam registration event data store 414. Exam registration event data for a particular exam registration event may include: a scheduled exam date, a scheduled exam time, a time at which the exam registration event occurred (i.e., exam registration event time), payment information, the number of days that registration occurred prior to the scheduled exam date, a simultaneous exam registration indicator, a cross-industry indicator, a financial fraud indicator, one or more unusual frequency/velocity indicators, and/or an authorization indicator.

The simultaneous exam registration indicator may represent the number of other exams that the candidate associated with the exam registration event simultaneously registered for (if any) when registering for the exam to which the exam registration event data corresponds. For example, exam registration event data corresponding to each exam registration event may include a start time at which the exam registration event began and an end time at which the exam registration event ended (e.g., when the exam was successfully registered for, which may coincide with submission of payment for the exam). The simultaneous exam registration event indicator for a given exam registration event may define the number of other exam registration events having ranges of start times to end times that at least partially overlap with the start time and the end time of the given exam registration event. A high valued simultaneous exam registration event indicator may contribute to a higher exam registration event risk score.

The cross-industry indicator may represent whether the candidate associated with a given exam registration event has registered for other exams across unrelated industries (e.g., unrelated to the industry associated with the exam being registered for). For example, the resource management servers 402 may analyze the exam registration history of the candidate associated with the exam registration event to identify the most frequently occurring industry type associated with exams taken by the candidate. If the resource management servers 402 determine that the industry type of the exam registered for via the exam registration event differs from the identified most frequently occurring industry type (e.g., does not match, or is not related to) based on the candidate's exam registration history, the value cross-industry indicator may modified. In some embodiments, this modification may simply set the cross-industry indicator to a binary value of 1, whereas in other embodiments, the cross-industry indicator may be set to a relevance score that may be generated by the resource management servers 402, the relevance score quantifying how relevant the industry of the exam registration event is to the most frequently occurring exam registration event of the candidate's exam registration history.

The financial fraud indicator may be generated based on the payment information, and may flag the exam registration event as a financial fraud risk if multiple cards (e.g., credit/debit cards) are used to pay for the exam registration, if a card used to pay for the exam registration has been used to pay for exams for multiple (e.g., more than a predetermined threshold number of) candidates. For example, a financial fraud look-up table may be stored in a memory included in or coupled to the resource management servers 402. The financial fraud look-up table may store a record of identified payment methods (e.g., cards) and associated exams that were paid for by those payment methods. In order to protect user privacy and card information, card numbers in the look-up table may be encrypted, rather than being stored as plain-text.

The unusual frequency/velocity indicators represent whether the candidate associated with the exam registration event has performed one or more registration activities (e.g., seat searches, exam registrations, exam reschedules, exam cancellations, exam no-shows) at a frequency or velocity greater than a predetermined frequency or velocity threshold. It should be noted that the frequency or velocity thresholds may vary across different registration activities. Here, "velocity" refers to the rate of change in frequency of registration activities conducted by the candidate. In some embodiments, normal registration activity patterns, with respect to registration activities, may be defined for the candidate, and the unusual frequency/velocity indicators may be asserted/triggered when the candidate's registration activity pattern differs sufficiently from their normal registration activity pattern. For example, if the candidate logs into their account once per day on average, and the system then detects that the candidate is logging in multiple times over the course of a smaller time period (e.g., multiple times per hour or per minute), such observed behavior may impact the exam registration event risk score.

Additionally, an aggregate normal registration activity pattern may be defined (e.g., for a particular exam or set of exams) based on historical registration activity of all or a group of candidates (e.g., the group of candidates who have registered for the exam or set of exams), and the candidate's registration activity pattern may be compared to this aggregate normal registration activity pattern. As an illustrative example, a certification may require multiple exams to be taken in a particular order. The aggregate normal registration activity pattern for these exams may indicate that candidates, on average, take each exam associated with the certification at two-month intervals. If a given candidate registers to take all of the exams associated with the certification within a single month, the system may identify (e.g., via the unusual frequency/velocity indicators) that the candidate's registration activity is anomalous, compared to the aggregate normal registration activity associated with those exams.

The authorization indicator may represent whether the exam registration event took place prior to an authorization file being provided on behalf of the candidate registering for the exam. For example, some exams may require third party authorization before an exam can be taken by a candidate, and premature registration for such exams may be associated with risk of anomalous behavior. In some embodiments, an exam authorization look-up table may be included in a memory included in or coupled to the resource management servers 402. The exam authorization look-up table may define, for each exam that may be registered for, whether that exam requires third-party authorization. The exam authorization look-up table may further define, for each exam requiring third-party authorization, a list of candidates that have received third party authorization to take that exam. The value of the authorization indicator may be set to 1 if the candidate is authorized to take the exam or if the exam does not require authorization, and may be set to 0 otherwise, or vice-versa.

The exam registration event model 434 may be a trained machine learning model, such as a neural network model, for example. For a given exam registration event, the exam registration event model 434 may retrieve and process exam registration event data corresponding to the given exam registration event from the exam registration event data store 414 in order to generate the exam registration event risk score 454. In some embodiments, the exam registration event risk score 454 may be sent from the exam registration event model 434 to be processed by the resource management server(s) 402 and/or one or more aggregate models 444, and/or to be stored in the risk score data store 424.

Test center data for a given test center may be collected and stored by the system 400 in the test center data store 416. It should be noted that the descriptions of a test center, test center data, and/or test center risk scores described herein may further be applied to any test center at which an anticipated testing activity will occur. The test center data may include: the name of the test center, the geographic location of the test center (e.g., including the country in which the test center claims to be located), an IP address of one or more computer devices of the test center (i.e., a test center IP address), the IP-address-based geolocation of the test center, a historical attack indicator associated with IP addresses of devices of the test center, exam registration history associated with the test center (e.g., a historical record of all exams that have been taken and/or that have been registered to be taken at the test center), a facility type of the test center, age of the test center, a software update compliance indicator, one or more exam result pattern indicators, one or more registration pattern indicators, a geolocation mismatch indicator, past investigations of test center, and an identified number of test centers located within a predefined radius of the test center.

As noted above, test center data for a given test center, collected and stored by the system 400 in the test center data store 416, may include one or more registration pattern indicators. In addition, or in combination with the data collected and stored for each testing facility, the disclosed system 400 may capture trend data for each facility for which test center data is stored in the test center data store 416 by the disclosed system 400.

As non-limiting examples, the trend data captured by the disclosed system may include, for each testing center/facility: scoring trends for the testing center/facility; candidate travel patterns for the testing center/facility; a frequency and rate of test schedules and reschedules at the testing center/facility; a number of other testing centers/facilities in close proximity to the testing center/facility; one or more exam type trends at the testing center/facility; and one or more bot traffic patterns for the testing center/facility.

The historical attack indicator for a given test center, may be asserted when the system determines that one or more IP addresses associated with computer devices of the test center have been previously identified as being involved with attacks (e.g., bot attacks, distributed denial of service (DDOS) attacks, teardrop attacks, hacking attempts, etc.) against the system 400 or associated systems (e.g., systems of other test centers associated with the system 400).

The facility type of the test center may be, for example, defined as either an owned test center (e.g., owned and/or managed by the entity that owns the system 400 and therefore assumed to be more trustworthy and less risky) or a third party test center. Third party test centers may be further categorized, in order of increasing risk, an Authorized Test Center Select (e.g., conforming to a first set of predetermined standards which may require biometric scanning and surveillance technologies), an Authorized Test Center (e.g., conforming to a second set of predetermined standards that may be associated with delivery of high stakes exams, but that may not require the same level of biometric scanning and surveillance technologies as the first set of predetermined standards), or a Private Test Center (e.g., for which no standard conformity can be/has been assessed). For example, biometric scanning may include palm vein scanning and recognition using one or more imaging devices and image analysis techniques for palm vein recognition.

The software update compliance indicator may represent how well a test center complies with software update cycles that are issued to it. For example, test centers that regularly delay implementation of required software updates may have a lower valued software update compliance indicator value compared to test centers that consistently implement required software updates within required/recommended time frames.

The registration pattern indicators may represent whether unusual spikes in registration activity have been detected in association with the test center. For example, if a number of registrations for exams at the test center occurring within a predetermined time period exceeds a predetermined threshold, this may be considered an "unusual spike" in registration activity, and the value of the registration pattern indicator for that test center may be updated to reflect the detection of the unusual spike (e.g., the value may increase for each unusual spike occurring within a predefined time window, or the value may change from 0 to 1 if more than a predetermined number of unusual spikes occur within the predefined time window). For example, if a number of searches for exams (e.g., occurring as part of a single registration event or multiple registration events) offered by the test center occurring within a predefined time window exceeds a predetermined threshold, this may be considered an "unusual spike" in registration activity, and the value of the registration pattern indicator may be updated to reflect the detection of the unusual spike.

The exam result pattern indicators may represent whether the test center has "unusually" high or low exam scores/results. For example, a test center's exam scores may be considered "unusually high" if they are greater than a predetermined threshold, which may be defined as a static threshold or a dynamic threshold. For example, a test center's exam scores may be considered "unusually low" if they are lower than a predetermined threshold, which may be defined as a static threshold or a dynamic threshold. If dynamic, such thresholds may be calculated based on overall exam scores at other, similar test centers (e.g., similar in location, age, and/or facility type).

The geolocation mismatch indicator may represent whether the geographic location of the test center that was provided by the test center matches the geographic location of the test center determined via IP geolocation based on the IP address of one or more computer systems of the test center. For example, the geolocation mismatch indicator may be a binary value with 1 representing a match and 0 representing a mismatch, or vice-versa.

In addition to the entity-related test center data described above, in embodiments where an anticipated risk score is generated in association with an anticipated testing activity, the disclosed system 400 may further be configured to gather data for entities likely to be involved in the anticipated testing activity, and, where an anticipated risk score is generated in association with an anticipated testing activity, the calculation of the anticipated risk score may include an anticipated test center data set. This additional data may define anticipated testing facilities to be involved in the anticipated testing activity, and may further include, as non-limiting examples, the type of each testing facility, anticipated identification requirements at each of the anticipated testing facilities, anticipated testing locations (e.g., countries, geographies) for each of the anticipated testing facilities, and the age of each of the testing facilities.

The test center model 436 may be a trained machine learning model, such as a neural network model, for example. For a given test center, or any test center at which the anticipated testing activity will take place, the test center model 436 may retrieve and process test center data corresponding to the given test center from the test center data store 416 in order to generate the test center risk score, or an anticipated test center risk score 456. In some embodiments, the test center risk score 456 may be sent from the test center model 436 to be processed by the resource management server(s) 402 and/or one or more aggregate models 444, and/or to be stored in the risk score data store 424.

Exam data for a given exam may be collected and stored by the system 400 in the exam data store 418. It should be noted that the descriptions of an exam, exam data, and/or exam risk scores described herein may further be applied to any exam involved in an anticipated testing activity. The exam data for the given exam may include: an exam type, a stakes rating, an item bank size (e.g., the number of questions included in the item/question bank of the exam), an item bank age (e.g., the amount of time since the item bank was last refreshed/updated), and/or web monitoring results.

The exam type of a given exam may be linear, adaptive, practice-based, or any other applicable exam type.

The stakes rating for a given exam may range from "low" to "high" stakes. For example, when an exam's outcome is considered to have a meaningful impact on the test-taker (e.g., tests for technical proficiency in a technical area, pre-employment exams, etc.) may be considered "high stakes," whereas an exam may be considered "low stakes" if its outcome is considered to have little or no impact on the test taker (e.g., formative exams without negative consequences for failure and/or positive consequences for success).

The web monitoring results for a given exam may be determined by performing one or more internet searches for exam content (e.g., questions and/or answers) that has been publically posted without permission (i.e., leaked) on social media or other websites, either presently or in the past. Exams for which exam content is determined to have been leaked online may be considered riskier than those that have not been leaked. In some embodiments, the web monitoring results may be a binary value, where "1" indicates leaked exam content is available on the web, and where "0" indicates leaked exam content is not available on the web. In some embodiments, the web monitoring results may be more complex, and may include a percentage of the total exam content that has been determined to have been leaked online, for example. For example, the web monitoring results may be updated periodically or in real or near-real time.

In addition to the entity-related exam data described above, in embodiments where an anticipated risk score is generated in association with an anticipated testing activity, the disclosed system 400 may further be configured to gather data for entities likely to be involved in the anticipated testing activity, and, where an anticipated risk score is generated in association with an anticipated testing activity, the calculation of the anticipated risk score may include an anticipated exam data set. This additional data may define the exam that is associated with the anticipated testing event, and may further include, as non-limiting examples, the type of exam, the stakes for the exam, the item bank size of the exam, the refresh rates of the exam, the delivery mechanism for the exam, and the web monitoring results for the exam. Put another way, the web monitoring results for the exam may determine whether the exam associated with the anticipated testing activity is being targeted for intellectual property theft, cheating, or the like.

The exam model 438 may be a trained machine learning model, such as a neural network model, for example. For a given exam, the exam model 438 may retrieve and process exam data corresponding to the given exam from the exam data store 418 in order to generate the exam risk score 458. In some embodiments, the exam risk score 458 may be sent from the exam model 438 to be processed by the resource management server(s) 402 and/or one or more aggregate models 444, and/or to be stored in the risk score data store 424.

A particular instance of a candidate taking an exam at a test center may be referred to herein as an "exam delivery event." Exam delivery event data for a given exam delivery event may be collected and stored by the system 400 in the exam delivery event data store 420. The exam delivery event data for the given exam delivery event may include: individual exam performance data, exam delivery type, biometric data, one or more candidate behavior indicators, object detection data, processes running on a client device (e.g., client device 106, 306, FIGS. 1, 3) on which the exam is being delivered, a blacklist process indicator, and/or video data that includes video of the candidate during some or all of the exam delivery event.

The individual exam performance data may include: item level data, the candidate's overall score on the exam, the overall time it took the candidate to complete the exam, keystroke analysis of keystrokes performed by the candidate while taking the exam, and/or delivery logs. The item level data may include: respective amounts of time spent by the candidate on responding to each individual item of the exam, respective scores of the candidate's responses to each individual item of the exam, and/or identified patterns of responses submitted by the candidate (e.g., if a candidate is taking a multiple-choice exam and responds to each item of the exam with response option "A" or responds in a repeating pattern such as "ABCDABCDABCD . . . ").

The exam delivery type may define how the exam is being delivered. Examples of exam delivery types may include: online-proctored and delivered at trusted test center, in-person-proctored and delivered at trusted test center, online-proctored and delivered remotely (e.g., at personal client device of candidate), online-proctored and delivered at 3rd-party test center, in-person-proctored and delivered at 3rd-party test center, online-proctored and delivered at "pop-up" test center, and/or in-person-proctored and delivered at "pop-up" test center. For example, the in-person-proctored exams may use a proctor who is present at the test center during the exam delivery event, while online-proctored exams may use a proctor who monitors exam delivery at a location other than that at which the exam is being delivered. Online-proctored exams may generally be associated with higher risk than in-person-proctored exams. Remote exam delivery may generally be associated with higher risk than pop-up test center exam delivery, which may generally be associated with higher risk than 3rd-party test center exam delivery, which may generally be associated with higher risk than trusted test center exam delivery.

The biometrics data may vary depending on the level of biometrics verification implemented at the testing center, but may generally include any of: one or more captured images or videos of the candidate's face and/or hands, recorded audio of the candidate's voice, one or more images of the candidate's fingerprints, keystroke analysis, mouse movement analysis, and/or palm vein recognition information. For example, palm vein scanning of a candidate's palm may be performed using one or more imaging devices and palm vein recognition techniques may be applied to compare one or more captured images of the candidate's palm to a previously captured and stored image of the candidate's palm in order to verify the candidate's identity. The biometrics data may be collected throughout an exam delivery event, and/or at the beginning and/or end of the exam delivery event. In some embodiments, the biometrics data may further include an indication that the candidate has refused to submit to the collection and/or use of the candidate's biometric data.

The one or more candidate behavior indicators may include gaze detection/tracking information and/or distraction level of the candidate. The gaze detection/tracking information may be obtained by recording video data of the candidate's face and/or eyes during the exam delivery event, and processing the video data (e.g., using one or more gaze determination/tracking algorithms) to determine where the candidate's gaze is focused throughout the exam delivery event. In some embodiments, the gaze detection/tracking information may be a basis for determining the distraction level of the candidate. For example, distraction level of the candidate may be determined as a ratio of the amount of time the candidate's gaze is focused on/directed to the screen and/or paper(s) on which the exam is being delivered, to the amount of time that the candidate's gaze is not focused on/directed to these testing materials. The less time the candidate spends looking at the testing materials, the higher the candidate's distraction level is considered to be.

The blacklist process indicator may be generated based on the list of processes running on the client device at which the exam is being delivered during the Exam delivery event. Each process of the list may be compared (e.g., by the resource management servers 402) to a "blacklist" that includes definitions of processes that are known to be unsafe/untrusted. Here, for example, an "unsafe" or "untrusted" process may include process that are known to be associated with software that may be used to cheat on an exam, or software that may be used to record exam information (e.g., exam questions and answers), which may be performed in the commission of exam intellectual property theft. The blacklist process indicator may be set based on whether one or more of the processes running on the client device are identified as matching one or more definitions of the blacklist. In an embodiment, the blacklist process indicator may be a binary value that is set to "1" if any of the processes running on the client device during the exam delivery event match a definition of the blacklist, and "0" otherwise (or vice versa). In an embodiment, the blacklist process indicator may be a value that is set equal to the number of processes running on the client device during the exam delivery event identified as matching one or more definitions of the blacklist. In some embodiments, the system may be configured to halt exam delivery to a candidate in response to the system identifying that a blacklisted process is running on the client device with which the candidate is taking the exam, regardless of the value of the exam delivery event risk score 460. In some embodiments, the system may be configured to halt exam delivery to a candidate in response to the system identifying both that a blacklisted process is running on the client device with which the candidate is taking the exam and that the exam delivery event risk score 460 exceeds a predetermined threshold.

The object detection data may be used to identify prohibited items in the area around the candidate during the exam delivery event and/or on the candidate's person. For example, the object detection data may identify prohibited phones and "smart" accessories such as glasses or watches with integrated computer hardware, which the candidate may be wearing or carrying during the testing event. Such prohibited items may be used to facilitate cheating, and their presence during an exam delivery event therefore increases risk.

The exam delivery event model 440 may be a trained machine learning model, such as a neural network model, for example. For a given exam delivery event, the exam delivery event model 440 may retrieve and process exam delivery event data corresponding to the given exam delivery event from the exam delivery event data store 420 in order to generate the exam delivery event risk score 460. In some embodiments, the exam delivery event risk score 460 may be sent from the exam delivery event model 440 to be processed by the resource management server(s) 402 and/or one or more aggregate models 444, and/or to be stored in the risk score data store 424.

Proctor data for a given proctor (i.e., a person supervising the administration of one or more exams remotely or at a test center) may be collected and stored by the system 400 in the proctor data store 422. It should be noted that the descriptions of a proctor, proctor data, and/or proctor risk scores described herein may further be applied to any proctor involved in an anticipated testing activity. The proctor data for the given proctor may include: an employment type indicator, a number of exams administered/supervised by the proctor in the proctor's lifetime, a number of years for which the proctor has been administering/supervising exam delivery, employment history data, and fraud history data, certification status of the proctor, and certification exam results of the proctor.

The employment type indicator may define whether the proctor is an employee of the test center, or if the proctor is a contractor. For example, to generate the employment type indicator, the resource management servers 402 may access a proctor employment type database that is stored in a memory included in or coupled to the resource management servers 402. The proctor employment type database may include a list of proctors and, for each proctor in the list, an employment type associated with that proctor.

The employment history data may define a number of different test centers that the proctor has worked for in the past. For example, to generate the employment history indicator, the resource management servers 402 may access a proctor employment history database that is stored in a memory included in or coupled to the resource management servers 402. The proctor employment history database may include a list of proctors and, for each proctor in the list, a number of different test centers for which that proctor has worked in the past.

The fraud history data may define a number of past fraud investigations involving the proctor and may identify fraud investigations in which the proctor was determined to be complicit in the commission of fraud. The fraud history data may additionally or alternatively identify any test centers included in the proctor's employment history data that have a history of involvement with fraud, regardless of whether the proctor was involved with those instances of fraud.

The certification status of a proctor may define which, if any, certifications (e.g., related to proctoring exams) have been earned by the proctor. Additionally, the certification status may identify whether such certifications are valid and up-to-date, or if they have expired.

The certification exam results of the proctor may define one or more scores achieved by the proctor on one or more certification exams taken by the proctor (e.g., certifications relevant to proctoring exams). The certification exam results may define the margin by which the proctor passed a given certification exam. The certification exam results may define a number of attempts made by the proctor to take a given certification exam before passing the certification exam (e.g., assuming the certification exam was eventually passed by the proctor).

The proctor model 442 may be a trained machine learning model, such as a neural network model, for example. For a given proctor, the proctor model 442 may retrieve and process proctor data corresponding to the given proctor from the proctor data store 422 in order to generate the proctor risk score 462. In some embodiments, the proctor risk score 462 may be sent from the proctor model 442 to be processed by the resource management server(s) 402 and/or one or more aggregate models 444, and/or to be stored in the risk score data store 424.

Another potential risk indicator involves candidates from one country registering to take an exam at a testing center in a different country. It should be noted that the descriptions of a country, country data, and/or country risk scores described herein may further be applied to any country in which an anticipated testing activity will take place. For example, in some instances candidates intending to commit fraud may attempt to take exams in other countries that they perceive as having less strict and/or lower-security test centers than those of their own country. Additionally, some countries may be identified as being generally associated (based on statistical data) with higher rates of exam and/or financial fraud (e.g., based on third-party data such as the corruption perceptions index (CPI)), while other countries may be identified as being generally associated (based on the third-party data) with lower rates of exam and/or financial fraud. Thus, the candidate's country and the country in which the test center is located may be relied upon as additional bases for determining risk.

The country model 443 may be a trained machine learning model, such as a neural network model, for example. For a given candidate who has registered to take an exam at a given test center, the country model 443 may retrieve the country of the candidate from the candidate data store 412, may retrieve the country of the test center from the test center data store 416, and may process inputs including the two countries in order to generate the country risk score 463. In some embodiments, the country risk score, and/or the anticipated country risk score 463 may be sent from the country model 442 to be processed by the resource management server(s) 402 and/or one or more aggregate models 444, and/or to be stored in the risk score data store 424. For example, the country risk score 463 may be defined based on one or more predefined zones, which may be organized according to risk level. For example, a "red zone" may indicate highest risk, a "green zone" may indicate lowest risk. Zones of other colors (e.g., orange, yellow, blue, etc.) representing areas of intermediate risk (i.e., greater risk than the red zone but lower risk than the green zone) may be defined along with corresponding risk values. In some embodiments, the risk value and boundary of a given zone may be defined based on data (e.g., the corruption perceptions index (CPI)) retrieved from a third party database. The country risk score 463 will generally be higher if the candidate country and the test center country are different or if either of the candidate country and the test center country are red zone countries, compared to if the candidate country and the test center country match and are green zone countries. In some embodiments, a separate data store may be maintained in the data store servers 410 for maintaining definitions of the boundaries and risk values associated with different risk zones.

In some embodiments, the resource management server(s) 402 may communicate with the model server 430 to cause the candidate model 432 to retrieve and process candidate data from the candidate data store 412 to generate the candidate risk score 452. For example, the resource management server(s) 402 may communicate with the model server 430 in this way in response to the resource management server(s) 402 receiving a notification or indication (e.g., via the at least one electronic communication network) that that a user profile registration event is in progress, that the user profile registration event has ended, that the exam registration event is in progress, that the exam registration event has ended, that the exam delivery event is in progress, or that the exam delivery event has ended. In some embodiments, the notification or indication may define a present state of the overall exam registration and delivery process, as will be described, and the resource management server(s) 402 may cause the candidate model 432 to generate the candidate risk score, and/or the anticipated candidate risk score 452 in response to identifying the state (e.g., if the state is any of: a real-time user profile registration event state, a post user profile registration event state, a real-time exam registration event state, a post exam registration event state, a real-time exam delivery event state or a post exam delivery event state).

In some embodiments, the resource management server(s) 402 may communicate with the model server 430 to cause the exam registration event model 434 to retrieve and process exam registration event data from the exam registration event data store 414 to generate the exam registration event risk score 454. For example, the resource management server(s) 402 may communicate with the model server 430 in this way in response to the resource management server(s) 402 receiving a notification or indication (e.g., via the at least one electronic communication network) that the exam registration event is in progress, that the exam registration event has ended, that the exam delivery event is in progress, or that the exam delivery event has ended. In some embodiments, the notification or indication may define a present state of the overall exam registration and delivery process, as will be described, and the resource management server(s) 402 may cause the exam registration event model 434 to generate the exam registration event risk score 454 in response to identifying the state (e.g., if the state is a real-time exam registration event state, a post exam registration event state, a real-time exam delivery event state or a post exam delivery event state).

In some embodiments, the resource management server(s) 402 may communicate with the model server 430 to cause the test center model 436 to retrieve and process test center data from the test center data store 416 to generate the test center risk score, and/or the anticipated test center risk score 456. For example, the resource management server(s) 402 may communicate with the model server 430 in this way in response to the resource management server(s) 402 receiving a notification or indication (e.g., via the at least one electronic communication network) that the exam registration event is in progress, that the exam registration event has ended, that the exam delivery event is in progress, or that the exam delivery event has ended. In some embodiments, the notification or indication may define a present state of the overall exam registration and delivery process, as will be described, and the resource management server(s) 402 may cause the test center model 436 to generate the test center risk score 456 in response to identifying the state (e.g., if the state is a real-time exam registration event state, a post exam registration event state, a real-time exam delivery event state or a post exam delivery event state).

In some embodiments, the resource management server(s) 402 may communicate with the model server 430 to cause the exam model 438 to retrieve and process exam data from the exam data store 418 to generate the exam risk score, and/or the anticipated exam risk score 458. For example, the resource management server(s) 402 may communicate with the model server 430 in this way in response to the resource management server(s) 402 receiving a notification or indication (e.g., via the at least one electronic communication network) that the exam registration event is in progress, that the exam registration event has ended, that the exam delivery event is in progress, or that the exam delivery event has ended. In some embodiments, the notification or indication may define a present state of the overall exam registration and delivery process, as will be described, and the resource management server(s) 402 may cause the exam model 438 to generate the exam risk score 458 in response to identifying the state (e.g., if the state is a real-time exam registration event state, a post exam registration event state, a real-time exam delivery event state or a post exam delivery event state).

In some embodiments, the resource management server(s) 402 may communicate with the model server 430 to cause the exam delivery event model 440 to retrieve and process exam delivery event data from the exam delivery event data store 420 to generate the exam delivery event risk score 460. For example, the resource management server(s) 402 may communicate with the model server 430 in this way in response to the resource management server(s) 402 receiving a notification or indication (e.g., via the at least one electronic communication network) that the exam delivery event is in progress or that the exam delivery event has ended. In some embodiments, the notification or indication may define a present state of the overall exam registration and delivery process, as will be described, and the resource management server(s) 402 may cause the exam delivery event model 440 to generate the exam delivery event risk score 460 based on the state defined in the notification or indication (e.g., if the state is a real-time exam registration event state, a post exam registration event state, a real-time exam delivery event state or a post exam delivery event state).

In some embodiments, the resource management server(s) 402 may communicate with the model server 430 to cause the proctor model 442 to retrieve and process proctor data from the proctor data store 422 to generate the proctor risk score, and/or the anticipated proctor risk score 462. For example, the resource management server(s) 402 may communicate with the model server 430 in this way in response to the resource management server(s) 402 receiving a notification or indication (e.g., via the at least one electronic communication network) that the exam delivery event is in progress or that the exam delivery event has ended. In some embodiments, the notification or indication may define a present state of the overall exam registration and delivery process, as will be described, and the resource management server(s) 402 may cause the proctor model 442 to generate the proctor risk score 462 based on the state defined in the notification or indication (e.g., if the state is a real-time exam delivery event state or a post exam delivery event state).

In some embodiments, the resource management server(s) 402 may communicate with the model server 430 to cause the country model 443 to retrieve and process candidate data from the candidate data store 412 and test center data from the test center data store 416 to generate the country risk score, and/or an anticipated country risk score 463. For example, the resource management server(s) 402 may communicate with the model server 430 in this way in response to the resource management server(s) 402 receiving a notification or indication (e.g., via the at least one electronic communication network) that the exam delivery event is in progress or that the exam delivery event has ended. In some embodiments, the notification or indication may define a present state of the overall exam registration and delivery process, as will be described, and the resource management server(s) 402 may cause the country model 443 to generate the country risk score 463 based on the state defined in the notification or indication (e.g., if the state is a real-time exam delivery event state or a post exam delivery event state).

Entity risk scores 450, which may include one or more of the candidate risk score 452, the exam registration event risk score 454, the test center risk score 456, the exam risk score 458, the exam delivery event risk score 460, the proctor risk score 462, and the country risk score, may be provided to one or more aggregate models 444 of the model server(s) 430, to the risk score data store 424, and/or the resource management server(s) 402.

In some embodiments, auxiliary data 466 from the data store servers 410 may also be provided as an input to the aggregate model(s) 444. For example, the auxiliary data 466 may include one or more elements of the candidate data, exam registration event data, test center data, exam data, exam delivery event data, and/or proctor data of the respective data stores 412-422. The aggregate model(s) 444 may include one or more trained machine learning model, such as a neural network model. For example, a given one of the aggregate models 444 may generate at least one aggregate risk score, and/or an aggregate anticipated risk score 464, which may be a "situational risk score" for a particular situation (e.g., a user profile registration event, an exam registration event or an exam delivery event occurring in real-time or near-real-time, or an overall exam registration and delivery process having occurred in the past). The aggregate risk score(s) 464 may be stored in the risk score data store 424 and/or may be sent to the resource management server(s) 402 for processing.

The resource management server(s) 402 may take one or more predefined actions based on the entity risk scores 450 and/or the aggregate risk score(s) and/or aggregated anticipated risk score(s) 464. In some embodiments, the resource management server(s) 402 may receive the entity risk scores/anticipated entity risk scores 450, and/or the aggregate risk score(s) 464 directly following their generation at the model server(s) 430. In some embodiments, the resource management server(s) 402 may instead retrieve the entity risk scores/anticipated entity risk scores 450 and/or the aggregate risk scores/aggregate anticipated risk scores 464 from the risk scored data store 424.

For example, upon receiving a given risk score of the entity risk scores 450 or a given aggregate risk score 454, the resource management server(s) 402 may compare the received risk score to a corresponding threshold. If the received risk score exceeds the corresponding threshold (e.g., indicating a higher-than-acceptable level of risk), one or more predefined actions may be taken. Otherwise, if the received risk score does not exceed the corresponding threshold (e.g., indicating an acceptable level of risk), the overall exam registration and delivery process may proceed to be evaluated/scored according to normal procedures.

Similarly, in embodiments where the disclosed system 400 calculates an anticipated risk score indicating a probability of an anticipated risk during an anticipated testing activity, the anticipated risk score may be compared to a threshold input and set by an administrator (possibly of the system or the associated exam data), and if the anticipated risk score exceeds the threshold, the system 400 may identify one or more recommended predefined actions. The one or more recommended predefined actions may provide a level of trustworthiness at least as high as the threshold to which the anticipated risk score was compared. In some embodiments, if the anticipated risk score exceeds the threshold, the system 400 may update a database entry associated in the data store with the entity data to include the one or more recommended predefined actions. In some embodiments, if the if the anticipated risk score exceeds the threshold, the system 400 may proceed as usual, and/or may generate a message to the administrator that the current testing configurations are acceptable and/or are within the administrator's acceptable parameters.

As an example of a predefined action that may be taken in response to determining that a received risk score exceeds a corresponding threshold, the resource management server(s) 402 may modify one or more database entries of a risk management database (e.g., which may be stored in a memory of the resource management server(s) 402 and/or may be stored in a memory of the data store server(s) 410 to flag the entity (e.g., candidate, anticipated candidate, test center, anticipated test center, anticipated proctor, and/or proctor) or "situation" (e.g., anticipated testing activity, exam delivery event, user profile registration event, or exam registration event) associated with the received risk score for human investigator follow-up. For example, the resource management server(s) may cause investigation information to be aggregated and sent to an e-mail account and/or user device associated with one or more human investigators, the investigation information identifying the candidate, test center, exam delivery event, user profile registration event, and/or exam registration event for which a fraud investigation should be initiated. In some embodiments, the investigation information may include evidential content (i.e., evidential of fraud), such as video data of the exam delivery event.

In performing such an investigation, an analysis may be performed on the entity data (e.g., candidate, anticipated candidate, exam registration event, test center, anticipated test center, exam, anticipated exam, exam delivery event, anticipated proctor data, and/or proctor data), relied upon by the model server(s) 430 to generate the received risk score, to identify entity data values that are outside their normal, defined boundaries (e.g., abnormal entity data values). These abnormal entity data values may then be flagged for human investigator follow-up. If available, evidential data (e.g., video data of an exam delivery event for which an abnormal entity data value has been identified), associated with the abnormal entity data values may be made available to the investigator (e.g. the investigator's user account/profile may be granted permission to access the video data, or the video data may be sent directly to an e-mail account of the investigator).

As an example of a predefined action that may be taken in response to determining that a received risk score exceeds a corresponding threshold, the resource management server(s) 402 may modify one or more database entries of the risk management database to request/require enhanced identity confirmation of the candidate (i.e., the enhanced identity confirmation may be in the form of a photo ID or a requirement that the candidate make an in-person visit to the testing facility prior to their registered exam date). For example, a request or requirement for enhanced identity confirmation may be made in response to candidate or exam registration event risk scores 452, 454 exceeding their corresponding thresholds, and/or in response to an aggregate risk score 464 associated with a situational exam registration event exceeding its corresponding threshold. Candidate refusal to submit to the enhanced identity verification may result in the candidate's exam score being invalidated (e.g., by flagging or otherwise marking the candidate's exam results as invalid by the resource management server(s) 402). For embodiments in which a candidate is taking an exam remotely (e.g., from a home or personal computer), the candidate may be required to travel to a local testing center within a defined time period in order to verify their identity.

As an example of a predefined action that may be taken in response to determining that a given candidate has a candidate risk score exceeding a corresponding threshold and/or is associated with an exam registration event risk score exceeding a corresponding threshold (circumstances referred to herein respectively as a "high candidate risk score" and a "high exam registration event risk score" for simplicity), the resource management server(s) 402 may modify one or more database entries of the risk management database to cause the candidate's user profile and/or an IP address associated with the candidate (e.g., as defined in candidate data associated with the candidate) to be blocked from registering for exams for a predetermined amount of time or until an administrator manually unblocks the candidate's user profile. In some embodiments, a high candidate risk score and/or exam registration event risk score may cause the resource management server(s) 402 to automatically trigger captchas to be implemented during a presently occurring exam registration event or future exam registration events involving the candidate. In some embodiments, a high candidate risk score and/or a high exam registration event risk score may cause the resource management server(s) 402 to require enhanced login security for the candidate's user profile, which may include 2-factor authentication.

In some embodiments, as an example of a predefined action that may be taken in response to determining that a given candidate has a candidate risk score exceeding a corresponding threshold and/or is associated with an exam registration event risk score exceeding a corresponding threshold, the resource management server(s) 402 may update and/or otherwise modify one or more database entries of the risk management database with a recommendation including: an investigation to determine a performance score for each of the plurality of testing facilities, the investigation comprising registering an individual to take an exam at a test center associated with the exam registration event to collect information about the test center to determine whether the test center is facilitating cheating or other unfair or fraudulent practices In some embodiments, if the collected information about the test center determines that the test center is facilitating cheating or other unfair or fraudulent practices, the test center may: lose a certification or may be given at least one additional limitation on test administration of at least one exam of a particular type of category; be invalidated from giving one or more particular types or classes of examination; and/or may be required to gather more forms of identification from candidates taking exams at the location of that test center.

As an example of a predefined action that may be taken in response to determining that one or more of the entity risk scores 450 or the aggregate risk scores 464 exceed their corresponding thresholds, the resource management server(s) 402 may modify one or more database entries of the risk management database to cause audio and/or video recording (e.g., executed by respective audio and/or video recording devices) to be activated during the exam delivery event associated with the high risk score. This could cause activation of audio/video recording could take place as the exam delivery event is occurring if the exam delivery event risk score or an aggregate/situational risk score related to the exam delivery event is being tracked (e.g., periodically updated) in real-time or near-real-time while the exam is being delivered. For example, if a candidate is exhibiting "risky" behavior during an exam delivery event, the exam delivery event risk score 458 and/or an aggregate risk score 464 based on the exam delivery event risk score 458 may increase beyond their corresponding thresholds, resulting in the activation of audio and/or video recording of the candidate during the exam delivery event by the resource management servers 402.

As an example of a predefined action that may be taken in response to determining that one or more of the entity risk scores 450 or the aggregate risk scores 464 exceed their corresponding thresholds, the resource management server(s) 402 may modify one or more database entries of the risk management database to cause a proctor monitoring the exam delivery event associated with the high risk score to be alerted that the exam delivery event is "high risk" and should be more closely monitored. For example, if a candidate is exhibiting "risky" behavior during an exam delivery event, the exam delivery event risk score 458 and/or an aggregate risk score 464 based on the exam delivery event risk score 458 may increase beyond their corresponding thresholds, resulting in an alert being sent to the proctor of the exam delivery event. If the proctor does not respond to the alert, the system 400 may identify that the proctor is ignoring the alert, and may record this event in the proctor data of the proctor (e.g., as ignoring the high risk alert may imply that the proctor is complicit).

As an example of a predefined action that may be taken in response to determining that one or more risk scores exceed corresponding thresholds, the resource management server(s) may modify one or more database entries of the risk management database to cause a hold to be placed on the candidate's score upon completion of the exam. When a hold is placed on a candidate's score, the candidate may be temporarily or permanently prevented from accessing the results of the exam they took during the exam delivery event. In some embodiments, the candidate may be notified that their score is being withheld (e.g., due to suspected cheating/fraud/intellectual property theft). For example, the notification may be displayed to the candidate via an electronic notification sent by the one or more processors to the computer device on which the candidate took the exam and may be displayed on a screen thereof.

As an example of a predefined action that may be taken if more than a predetermined threshold number of entity risk scores 450 and/or aggregate risk scores 464 exceed their corresponding thresholds during an exam delivery event, the resource management server(s) 402 may modify one or more database entries of the risk management database to halt the exam delivery event as a proactive intervention. For example, risky candidate behavior may be associated with commission of intellectual property theft (e.g., taking an exam in order to memorize and subsequently sell, distribute, or publish the exam questions), and halting the exam before it is complete may protect against such intellectual property theft. In some embodiments, the resource management server(s) 402 may allow the candidate to continue taking the exam, despite one or more thresholds being exceeded by one or more of the entity risk scores 450 and/or the aggregate risk score 464, but may modify the exam delivery, such that questions provided as part of the exam may be retrieved from a mock item bank rather than the actual item bank for that exam in order to prevent the actual exam questions from being stolen without overtly alerting the candidate. In some embodiments, if the exam delivery event is scheduled, but has not yet occurred, the modification of the database entries may cause the scheduled exam delivery event to be cancelled.

As an example of a predefined action that may be taken if more than a predetermined threshold number of entity risk scores 450 and/or aggregate risk scores 464 exceed their corresponding thresholds during an exam delivery event, the resource management server(s) 402 may modify one or more database entries of the risk management database to cause processes running on the client device (e.g., client device 106, 306, FIGS. 1, 3) at which the exam is being delivered to be analyzed by the resource management server(s) 402 (or, alternatively, another applicable server/device coupled to the client device) so that a process blacklist or whitelist of processes may be updated. In performing this analysis, a list of all processes running on the client device during the exam delivery event may be retrieved by the resource management server(s) 402, and each process may be identified as corresponding to a safe/trusted process, or as an unsafe/untrusted process. Safe/trusted processes may be identified via comparison to an existing process "whitelist" which may be maintained by a memory device of the remote management server(s) 402 or coupled to the remote management server(s) 402. Unsafe/untrusted processes may be identified via comparison to an existing process "blacklist" which may be maintained by the memory device. If a given process running on the client device during exam delivery is not determined to match any processes of the whitelist or the blacklist, the process may be marked for further review. This further review may involve human intervention, in which a human investigator determines whether the given process should be added to the whitelist (safe) or added to the blacklist (unsafe). In some embodiments, a trained machine learning model may be applied to analyze the given process to generate a recommendation as to whether the process should be whitelisted or blacklisted. In some embodiments, a trained machine learning model may be applied to analyze the given process to automatically add the process to a whitelist or a blacklist.

As an example of a predefined action that may be taken if a test center risk score 456 exceeds one or more corresponding thresholds, the resource management server(s) 402 may modify one or more database entries of the risk management database to either recommend or automatically perform authorization revocation (e.g., which may effectively revoke a test center's "trusted" status) or temporary suspension of operation of the test center for which the test center risk score 456 has been calculated (e.g., depending on whether such automatic action is enabled). In some embodiments, a test center may be shut down permanently if the test center risk score 456 has exceeded a sufficiently high threshold. In some embodiments, an automated forensic investigation of the test center may be initiated in response to determining that the test center risk score 456 exceeds one or more corresponding thresholds. For example, the automated forensic investigation may include performing data analytics on the success rates of all candidates who have taken exams at the test center, on patterns of interaction between such candidates and test center workstations (i.e., client devices on which exams are delivered at the test center), on processes running on test center workstations, and/or on facial image data captured of candidates to which exams have been delivered at the test center. The automated forensic investigation may identify if candidate success rates at the test center are abnormally high or low (e.g., compared to an overall average or test-specific averages across multiple test centers), may identify blacklisted processes running on test center work stations, and may identify exam delivery events during which facial recognition results for a corresponding candidate change significantly at one or more points throughout the exam delivery event.

As an example of a predefined action that may be taken if a proctor risk score 462 exceeds one or more corresponding thresholds, the resource management server(s) 402 may modify one or more database entries of the risk management database to either recommend or automatically require that the proctor associated with the proctor risk score 462 undergo re-training or re-certification, or, if the risk score 462 exceeds a sufficiently high threshold, recommend termination of or automatically terminate the proctor.

As an example of a predefined action that may be taken if an exam risk score 458 or an aggregate risk score derived from the exam risk score 458 exceeds one or more corresponding thresholds, the resource management server(s) 402 may modify one or more database entries of the risk management database to either recommend or automatically require that the content of the exam be updated. In some embodiments, the recommendation or requirement that a content of the exam be updated may be generated in response to determining that the exam risk score 458 exceeds a predefined threshold, and that, based on web monitoring results of the exam data, exam content is being posted online (e.g., is being publically posted on social media or is being offered for sale online). Recommending or requiring that the content of the exam be updated in this way may be dependent, in some embodiments, on a delivery type of the exam. For example, if an exam is given using a "static" exam delivery method (e.g., with exam questions being delivered in the same order each time, or being delivered in an order that is defined at the beginning of exam delivery and remains the same throughout exam delivery), the predefined threshold, which, when exceeded by the exam risk score 458 or the aggregate risk score, causes the recommendation or requirement to update exam content to be generated, may be comparatively lower (i.e., less risk is required to trigger recommending or requiring exam content to be updated). If, conversely, the exam is given using a "dynamic" exam delivery method (e.g., the order in which exam questions are delivered to a candidate may change during exam delivery based on the candidate's responses), then the predefined threshold may be comparatively higher. Exam delivery type may be defined in the exam data.

In some embodiments, a system of tiered thresholds may be defined, with the exam delivery event being modified to draw from the mock item bank in response to a first threshold being exceeded by a corresponding risk score, and with the exam delivery event being halted in response to a second threshold that is higher than the first threshold being exceeded by the corresponding risk score.

In some embodiments in which tiered thresholds are used, a separate threshold may be defined for each predefined action, such that the number of predefined actions taken by the resource management server(s) 402 may increase as the corresponding risk score or risk scores increase in value. In this way, fraud/theft preventative action may be scaled up as risk increases.

The resource management server(s) 402 may access a look-up table in order to retrieve predefined thresholds and to identify the predefined actions and/or risk scores to which each threshold corresponds. An illustrative example of the content that may be included in a look-up table that defines thresholds and predefined actions specific to the aggregate risk score 464, is provided in Table 1, below. In the example of Table 1, risk score values and risk score thresholds are normalized on a scale of 0 to 100. It should be understood that the particular threshold values provided in Table 1 are intended to be illustrative, and not limiting. Other applicable threshold ranges may be defined in various embodiments.

TABLE 1

| Risk Score Threshold | Predefined Action |
| --- | --- |
| 40 | Increase monitoring frequency of exam delivery event |
| 50 | Trigger enhanced identity verification |
| 60 | Trigger enhanced monitoring of exam delivery event |

TABLE 1-continued

| Risk Score Threshold | Predefined Action |
| --- | --- |
| 70 | Initiate Investigation of Relevant Entities |
| 80 | Hold Exam Results |
| 90 | Halt or Cancel Exam Delivery Event |

Figure 5:
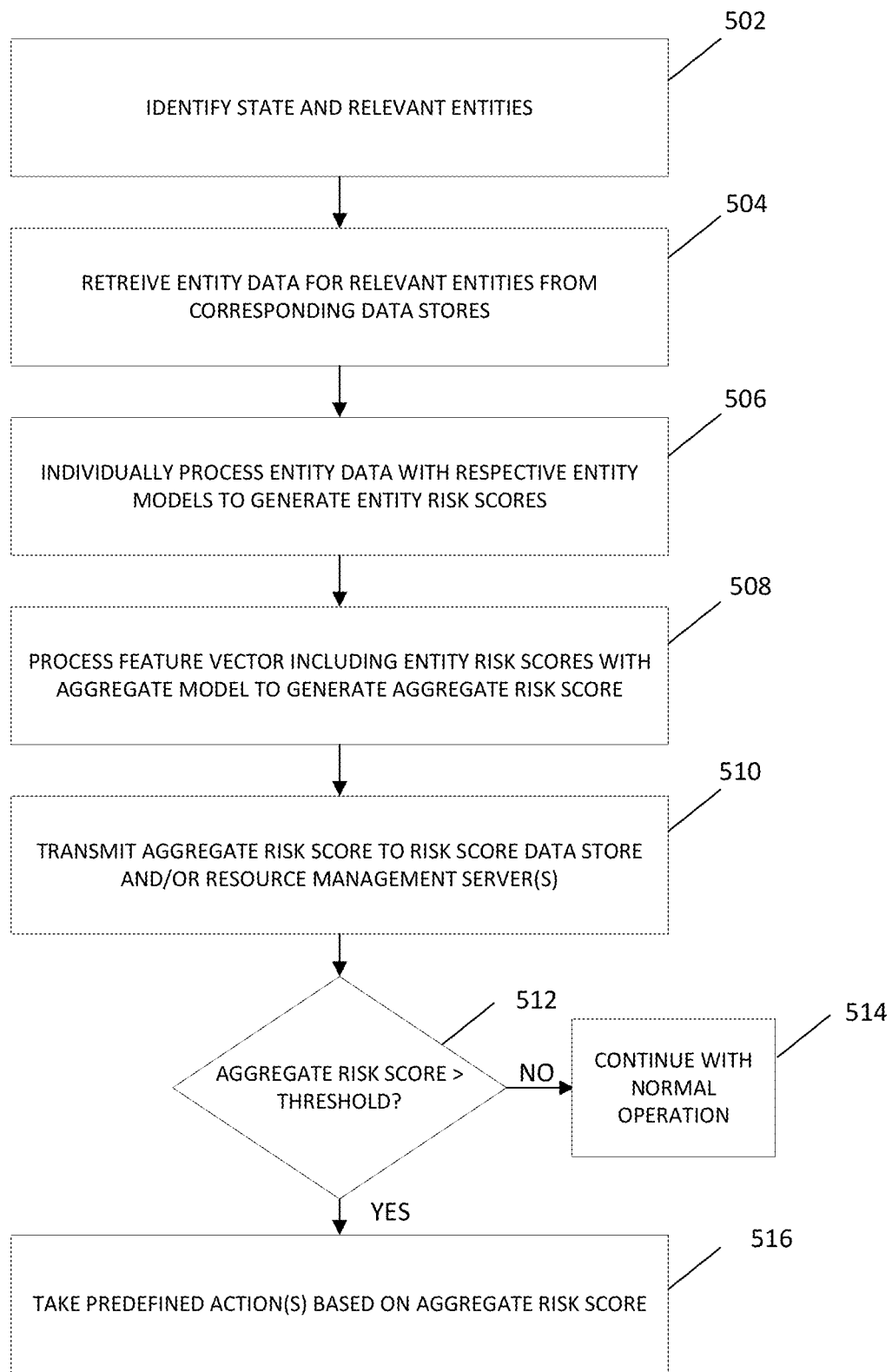
FIG. 5 is an illustrative process flow for a method of generating individual and an aggregate risk score for metrics corresponding to examination-related entities, and taking one or more predefined actions based on the aggregate risk score, in accordance with the present disclosure.

FIG. 5 shows an illustrative process flow for a method by which a system (e.g., system 400 of FIG. 4) may generate entity risk scores, and/or anticipated entity risk scores, for a number of entities associated with an overall exam registration and delivery process, generate an aggregate or "situational" risk score, and/or aggregate anticipated risk score based on the entity risk scores/anticipated entity risk scores, and take one or more predefined actions if the aggregate risk score exceeds a predetermined threshold. For example, this method may be performed by executing computer-readable instructions with one or more computer processors (e.g., any applicable combination of processors of servers 102, 112, 200, 302, 312, 402, 410, 430 of FIGS. 1A, 2, 3, 4). This method may be performed following an exam delivery event, or may be performed in real-time or near-real-time during an exam delivery event, during an exam registration event, and/or a user profile registration event.

At step 502, the one or more computer processors may identify a present state of the overall exam registration and delivery event process, and may identify entities that are relevant to that state in response to which the method is being performed. For example, such states may include: a real-time user profile registration event state, a post user profile registration event state, a real-time exam registration event, a post exam registration event state, a real-time exam delivery event state, and a post exam delivery event state. The real-time user profile registration event state may occur while a candidate is in the process of registering a user profile for the first time. The post user profile registration event state may occur when a candidate has already registered a user profile, but has not yet registered for an exam. The real-time exam registration event state may occur while a candidate is in the process of registering for an exam. The post exam registration event state may occur when the candidate has already registered for an exam, prior to the delivery of the exam. The real-time exam delivery event state may occur while a candidate is in the process of taking an exam. The post exam delivery event state may occur after the candidate has taken an exam.

In the real-time user profile registration event state and the post user profile registration event state, the relevant entities may include the candidate. In the real-time exam registration event state and the post exam registration event state, the relevant entities may include the candidate, the exam registered for, the exam registration event itself, the test center at which the candidate is registering/registered to take the exam, and the candidate/test center countries. In the real-time exam delivery event state and the post exam delivery event state, the relevant entities may include candidate, the delivered exam, the exam registration event performed by the candidate to register for the delivered exam, the test center at which the exam is delivered, the candidate/test center countries, and the proctor supervising/administering the exam. For example, the one or more computer processors may access a look-up table in memory to determine which entities are related to any given state. An illustrative example of the content that may be included in such a look-up table is provided in Table 2, below.

TABLE 2

| State | Related Entities |
|---|---|
| Real-time user profile registration event state | Candidate |
| Post user profile registration event state | Candidate |
| Real time exam registration event state | Candidate, exam, test center, exam registration event, countries |
| Post exam registration event state | Candidate, exam, test center, exam registration event, countries |
| Real-time exam delivery event state | Candidate, exam, test center, exam registration event, countries, exam delivery event, proctor |
| Post exam delivery event state | Candidate, exam, test center, exam registration event, countries, exam delivery event, proctor |

At step 504, the one or more computer processors may retrieve entity data corresponding to each of the relevant entities identified in step 502. For example, the entity data may include candidate data, anticipated candidate data, exam registration event data, test center data, anticipated test center data, exam data, anticipated exam data, exam delivery event data, anticipated proctor data, and/or proctor data, which may be retrieved from corresponding data stores of a data store server (e.g., data stores 412-422 of data store server(s) 410 of FIG. 4). For example, the entity data may be retrieved by a model server that includes one or more trained AI/machine learning models (e.g., model server 430 of FIG. 4), and the model server may be coupled to the data store server via one or more communication networks (e.g., communication networks 120, 122, 320, 322 of FIGS. 1A, 3).

At step 506, the one or more computer processors may individually process the entity data (e.g., at the model server) using respective entity models to generate risk scores and/or anticipated risk scores. A given set of entity data corresponding to a given relevant entity may be processed by a trained machine learning model that is specific to that entity type in order to generate a risk score and/or an anticipated risk score for that entity-type. For example, candidate data of the entity data corresponding to a relevant candidate would belong to a candidate entity type, and would therefore be processed by a candidate model (e.g., candidate model 432 of FIG. 4) to generate a candidate risk score (e.g., candidate risk score 452 of FIG. 4). As another example, exam data of the entity data corresponding to a relevant exam would belong to an exam entity type, and would therefore be processed by an exam model (e.g., exam model 438 of FIG. 4) to generate an exam risk score (e.g., exam risk score 458 of FIG. 4).

At step 508, a feature vector that includes the various entity risk scores (e.g., risk scores 450 of FIG. 4) generated at step 506 may be sent to and processed by an aggregate model, which may be hosted by the model server, (e.g., aggregate model 444 of model server 430 of FIG. 4). The aggregate model may be trained/configured to generate an aggregate (e.g., situational) risk score and/or aggregate anticipated risk score corresponding to a particular state, which may be: a real-time user profile registration event state, a post user profile registration event state, a real-time exam registration event, a post exam registration event state, a real-time exam delivery event state, or a post exam delivery event state. In some embodiments, separate aggregate models may be available for each of these states, and the particular aggregate model used to process the feature vector may be selected based on the current state.

In some embodiments, the feature vector may further include auxiliary information (e.g., auxiliary data 466 of FIG. 4) related to one or more of the relevant entities, which may be retrieved from one or more of the data stores of the data store servers. For example, the auxiliary information may include one or more elements of one or more of candidate data, exam registration event data, test center data, exam data, exam delivery event data, and proctor data.

At step 510, the one or more processors may cause the aggregate risk score and/or the aggregate anticipated risk score to be stored on a risk score data store (e.g., risk score data store 424 of data store servers 410 of FIG. 4) and/or to be delivered to one or more resource management servers (e.g., resource management servers 402 of FIG. 4) for processing.

At step 512, the one or more processors may determine whether the aggregate risk score and/or the aggregate anticipated risk score exceeds a corresponding predetermined threshold. If so, the method proceeds to step 516. Otherwise the method proceeds to step 514, where the system continues its normal operation.

At step 516, the one or more processors (e.g., of the resource management servers) may perform one or more predefined actions based on the aggregate risk score and/or the aggregated anticipated risk score.

As an example of a predefined action that may be taken in response to determining that a received aggregate risk score exceeds a corresponding threshold, the resource management servers may flag the "situation" (e.g., exam delivery event, user profile registration event, or exam registration event) or entity (e.g., candidate, test center, or proctor) associated with the aggregate risk score for human investigator follow-up. In such cases, an analysis may be performed on the entity data (e.g., candidate, exam registration event, test center, exam, exam delivery event, and/or proctor data), relied upon by the aggregate model to generate the received risk score, to identify entity data values that are outside their normal, defined boundaries (e.g., abnormal entity data values). These abnormal entity data values may then be flagged for human investigator follow-up. If associated data is available (e.g., video data of an exam delivery event for which an abnormal entity data value has been identified), that associated data may be made available to the investigator (e.g. the investigator's user account/profile may be granted permission to access the video data, or the video data may be sent directly to an e-mail account of the investigator).

As an example of a predefined action that may be taken in response to determining that a received aggregate risk score exceeds a corresponding threshold, the resource management servers may request/require enhanced identity confirmation from the candidate. For example, the enhanced identity confirmation may be in the form of a photo ID or a requirement that the candidate make an in-person visit to the testing facility prior to their registered exam date. For example, the request for enhanced identity confirmation may be made in response to the aggregate risk score exceeding its corresponding threshold if the aggregate risk score is associated with a situational exam registration event.

As an example of a predefined action that may be taken in response to determining that the aggregate risk score exceeds a predetermined threshold, the resource management servers may cause the candidate's user profile to be blocked from registering for exams for a predetermined amount of time or until an administrator manually unblocks the candidate's user profile. As an example of a predefined action that may be taken in response to determining that the aggregate risk score exceeds a predetermined threshold, the resource management servers may automatically trigger captchas to be implemented during a presently occurring exam registration event or future exam registration events involving the candidate. As an example of a predefined action that may be taken in response to determining that the aggregate risk score exceeds a predetermined threshold, the resource management servers may require enhanced login security for the candidate's user profile, which may include 2-factor authentication.

As an example of a predefined action that may be taken in response to determining that the aggregate risk score exceeds a predetermined threshold, the resource management servers may cause audio and/or video recording to be activated during the exam delivery event associated with the high risk score. This could activation of audio/video recording could take place as the exam delivery event is occurring if the aggregate risk score related to the exam delivery event is being monitored in real-time or near-real-time while the exam is being delivered (e.g., if the state is a real-time exam delivery event state). For example, if a candidate is exhibiting "risky" behavior during an exam delivery event, the aggregate risk score may increase beyond its corresponding thresholds, resulting in the activation of audio and/or video recording of the candidate during the exam delivery event by the resource management servers.

As an example of a predefined action that may be taken in response to determining that the aggregate risk score exceeds a predetermined threshold, the resource management servers may halt the exam delivery event as a proactive intervention.

In some embodiments, the method of FIG. 5 may be performed continuously throughout the progression of states of the overall exam registration and delivery process, with predefined actions potentially being taken at each state if the situational/aggregate risk score generated for that state exceeds one or more corresponding predetermined thresholds.

Figure 6A:
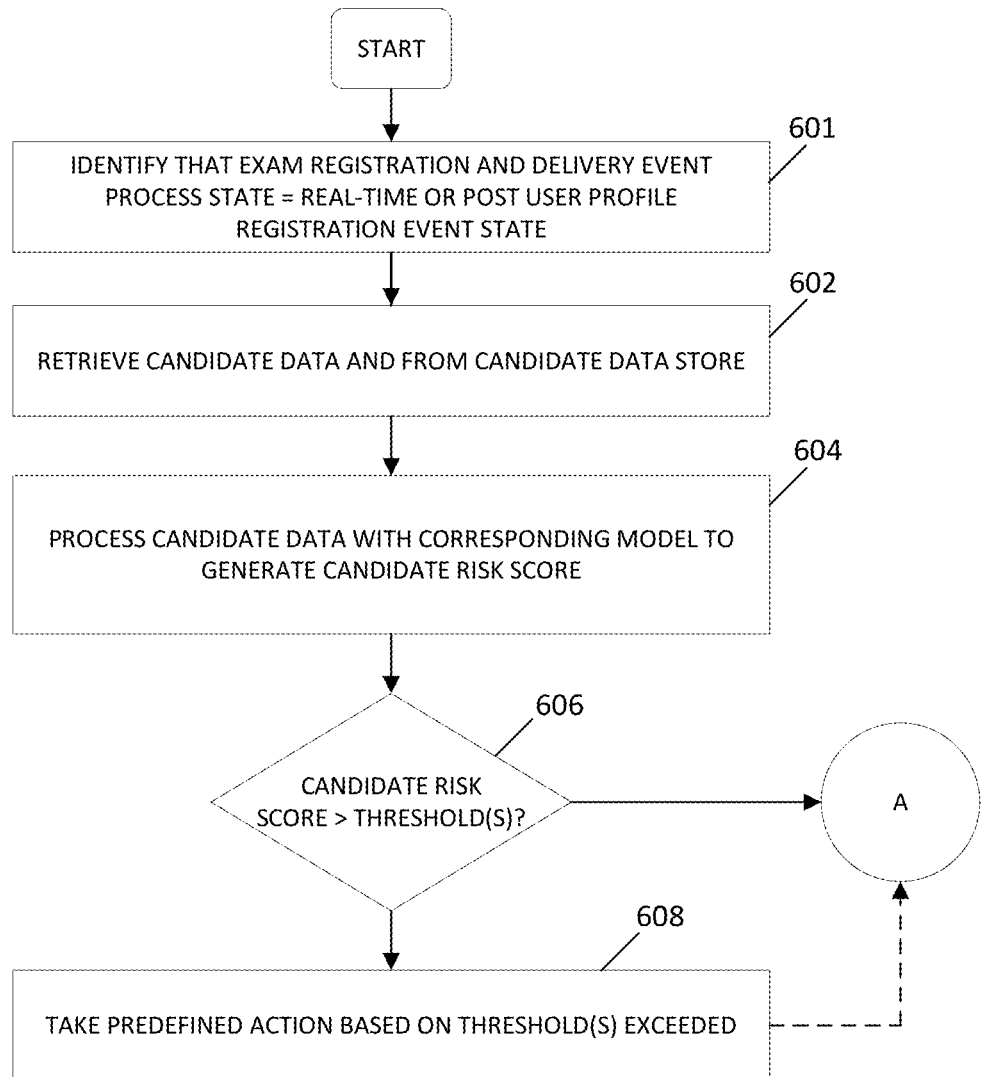
FIGS. 6A-6C are an illustrative process flow for a method of progressive risk scoring and risk mitigation based on metrics corresponding to examination-related entities, in accordance with the present disclosure.
Figure 6B:
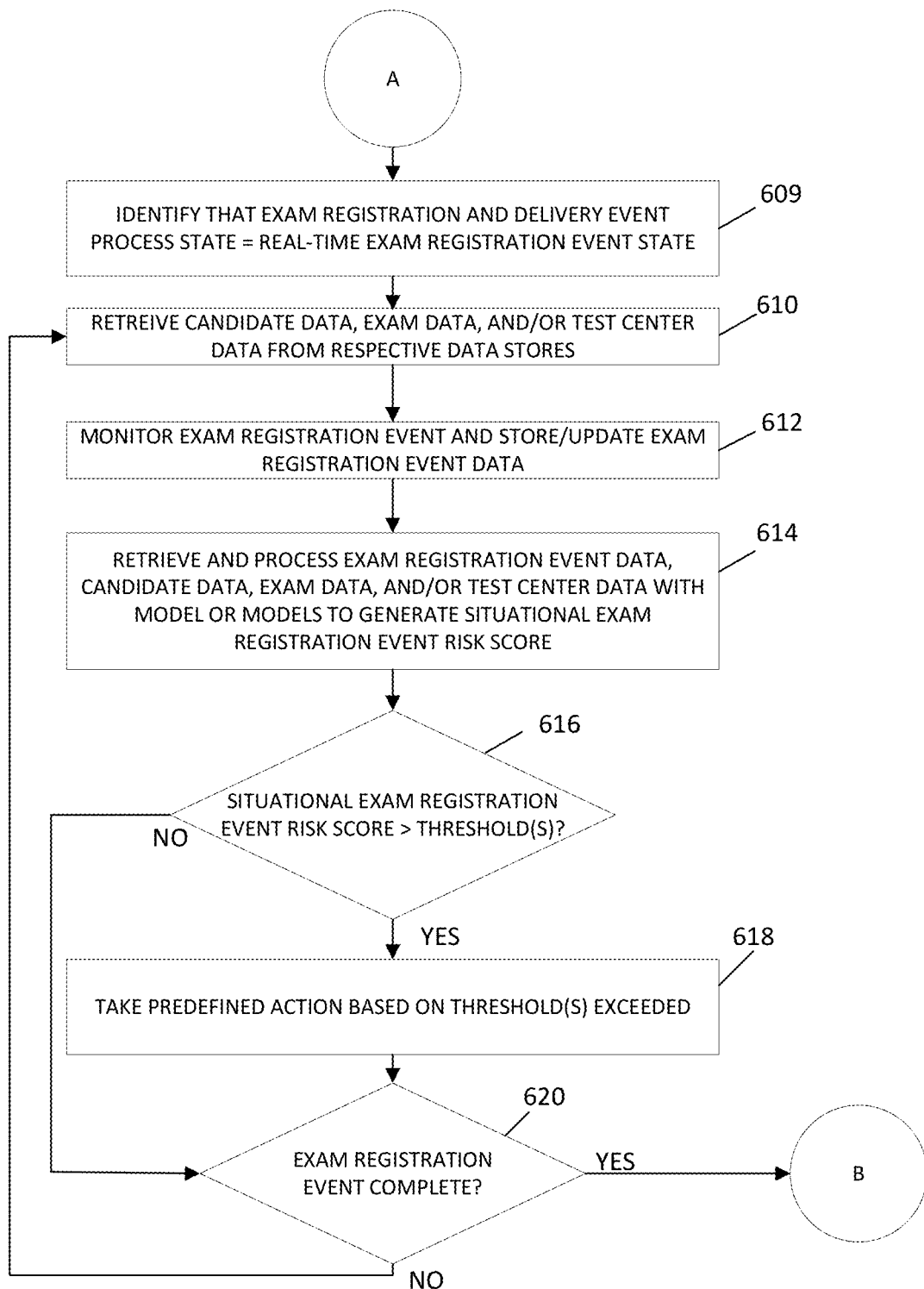
Figure 6C:
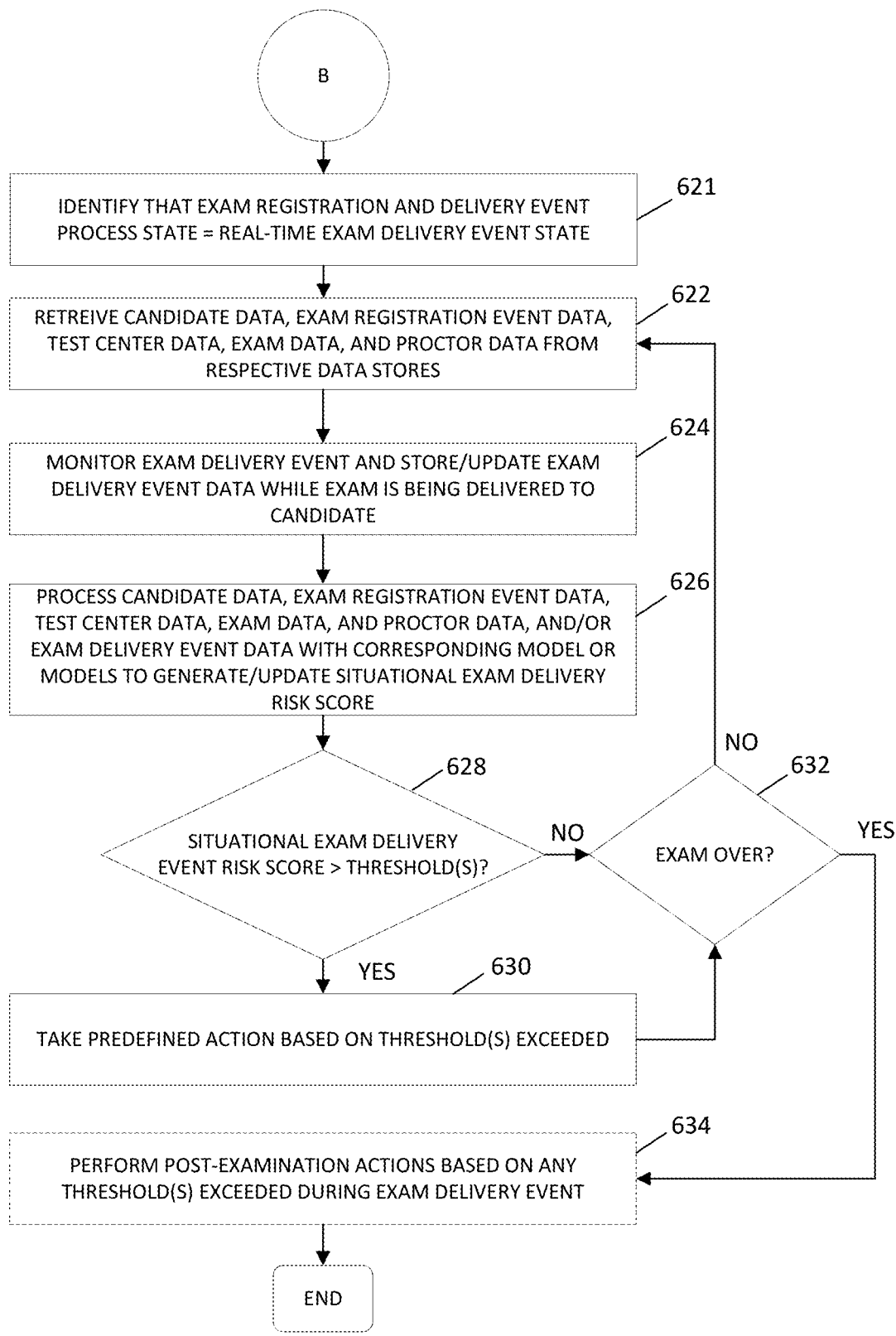

FIGS. 6A-6C illustrate a process flow for a method of real-time or near-real-time risk assessment and response as a candidate's actions progress through different states of an overall exam registration and delivery process. As above, these states may include a real-time user profile registration event state, a post user profile registration event state, a real-time exam registration event state, a post exam registration event state, a real-time exam delivery event state, and a post exam delivery event state (sometimes referred to as a scoring event state). Each state may be associated with a particular entity or group of entities, and a situational/aggregate risk score calculated at a particular state may be based on entity data corresponding to the entity or group of entities associated with that state. For example, this method may be performed by executing computer-readable instructions with one or more computer processors (e.g., any applicable combination of processors of servers 102, 112, 200, 302, 312, 402, 410, 430, of FIGS. 1A, 2, 3, 4). This method may be performed following an exam delivery event, or may be performed in real-time or near-real-time during an exam delivery event, during an exam registration event, and/or a user profile registration event.

The flow chart of FIG. 6A depicts a portion of the method that may be performed during the real-time user profile registration event state or the post user profile registration event state.

At step 601, the one or more computer processors (e.g., which may include a processor of a resource management server, such as resource management server 402 of FIG. 4) may identify that the state of the exam registration and delivery event process is presently either the real-time or the post user profile registration event state. For example, the one or more computer processors may receive a notification indicating that the exam registration and delivery event process has entered either the real-time or the post user profile registration event state. The notification may be generated in response to the initiation or completion of the user profile registration event by the candidate. The one or more computer processors may identify that the relevant entity or entities for either the real-time or post user profile registration event states includes the candidate that has performed or that is performing the user-profile registration.

At step 602, the one or more computer processors (e.g., which may include a processor of a model server such as model server 430 of FIG. 4) may retrieve candidate data from a candidate data store that may be included in a data store server (e.g., candidate data store 412 of data store server 410 of FIG. 4). The retrieved candidate data may correspond to the candidate associated with the particular user profile registration event for which risk assessment and response is being performed.

At step 604, the one or more computer processors (e.g., which may include a processor of a model server such as model server 430 of FIG. 4) may process the candidate data retrieved from the candidate data store with a corresponding candidate model that may be included in a model server (e.g., candidate model 432 of model servers 430 of FIG. 4) to generate a candidate risk score (e.g., candidate risk score 452 of FIG. 4) based on the candidate data.

At step 606, the one or more computer processors (e.g., which may include a processor of a resource management server such as resource management server 402 of FIG. 4) may determine whether the candidate risk score exceeds one or more predetermined candidate risk score thresholds. If the candidate risk score exceeds any predetermined candidate risk score thresholds, the method may proceed to step 608. Otherwise, the method may proceed via node A to step 609 of the flow chart depicted in FIG. 6B. It should be understood that a delay may occur before the method proceeds to step 609, as there may be a delay between the occurrence of the user profile registration event and a subsequent exam registration event being performed by the candidate.

At step 608, the one or more computer processors (e.g., which may include a processor of a resource management server such as resource management server 402 of FIG. 4) may take one or more predefined actions based on which candidate risk score thresholds were determined to have been exceeded at step 606. For example, predefined actions that may be taken at this stage may include: requiring enhanced identity verification of the candidate, triggering a human investigation of the candidate, and/or preventing the candidate from using the system.

As an example of a predefined action that may be taken in response to determining that the candidate risk score exceeds one or more thresholds, enhanced identity verification may be required before allowing the candidate to register for exams and/or may be triggered when the candidate arrives at a test center to take an exam. The enhanced identity verification may involve two-factor identification, photograph identification requirements, and/or biometric analysis.

As an example of a predefined action that may be taken in response to determining that the candidate risk score exceeds one or more thresholds, a human investigation may be triggered, which involve sending relevant information (e.g., some or all of the candidate data) to a human investigator. The investigator may then manually exonerate the candidate, or limit or disable the candidate's access to the system based on their review of the information. In some embodiments, preventing the candidate from using the system may involve denying the candidate's user profile registration, adding the candidate's IP address to an IP address "blacklist" that prevents communications from IP addresses on the blacklist (including those from the candidate's computer, in this case) from reaching and/or being responded to by the system, and/or adding an e-mail address provided by the client to an e-mail address blacklist, where candidates attempting to register a user profile using an e-mail address on the e-mail address blacklist are disallowed from registering (and may be subject to further action, such as IP address blacklisting described above).

In some embodiments, despite the candidate risk score exceeding one or more candidate risk score thresholds, the one or more computer processors may allow the candidate to successfully register their user profile, but may flag the candidate as having a non-negligible risk level. Such flagging may be reflected in the candidate data for that candidate, and may therefore be taken into account by subsequent risk assessment processes involving the candidate. If the candidate is able to successfully register their user profile, the method may proceed to step 610 of FIG. 6B via node A.

The flow chart of FIG. 6B illustrates a portion of the method that may be performed during the real-time exam registration event state.

At step 609, the one or more computer processors (e.g., which may include a processor of a resource management server, such as resource management server 402 of FIG. 4) may identify that the state of the exam registration and delivery event process is presently the real-time exam registration event state. For example, the one or more computer processors may receive a notification indicating that the exam registration and delivery event process has entered the real-time exam registration event state. The notification may be generated in response to the initiation of the exam registration event by the candidate (e.g., in response to the candidate navigating, with a client computer device, to a registration page of a registration website associated with the system). The one or more computer processors may identify that relevant entity or entities for the exam registration event state includes the candidate performing the registration, the exam for which the candidate is registering, the exam registration event itself, and the test center at which the candidate registers to take the exam.

At step 610, the one or more computer processors (e.g., which may include a processor of a model server such as model server 430 of FIG. 4) may retrieve candidate data, exam data, and/or test center data from respective candidate, exam, and/or test center data stores (e.g., data stores 412, 416, 418 of data store server 410 of FIG. 4). The retrieved data may correspond to entities associated with the particular exam registration event for which risk assessment and response is being performed.

At step 612, the one or more computer processors (e.g., which may include a processor of a resource management server such as resource management server 402 of FIG. 4) may monitor the ongoing exam registration event, and may store and/or update exam registration event data in an exam registration event data store (e.g., exam registration event data store 414 of FIG. 4). While shown here to occur periodically, it should be understood that in some embodiments, this monitoring and updating step may occur continuously in parallel with steps 614-620 so that candidate behavior may be constantly monitored throughout the exam registration process. In some embodiments, the frequency at which the respective monitoring and updating of the exam registration event and exam registration event data is performed may be set based on the situational exam registration event risk score generated at step 614 (e.g., may be increased as the situational exam registration event risk score increases).

At step 614, the one or more processors (e.g., which may include a processor of a model server such as model server 430 of FIG. 4) process the exam registration event data, candidate data, exam data, and/or test center data with one or more models to generate a situational exam registration event risk score (e.g., aggregate risk score 464 of FIG. 4). For example, entity-level models (e.g., models 432, 434, 436, 438, 443 of FIG. 4) may separately process the exam registration event data, the candidate data, the test center data, and the exam data to respectively produce entity risk scores that may include: an exam registration event risk score (e.g., exam registration event risk score 454 of FIG. 4), a candidate risk score (e.g., candidate risk score 452 of FIG. 4), a test center risk score (e.g., test center risk score 456 of FIG. 4), an exam risk score (e.g., exam risk score 458 of FIG. 4), and/or a country risk score (e.g., country risk score 463 of FIG. 4). In some embodiments, one or more of these risk scores may be generated prior to the performance of the method and/or of step 614 and, instead of being generated at this step, may be retrieved from a risk score data store (e.g., risk score data store 424 of FIG. 4).

The produced and/or retrieved risks scores may then be input to a situational exam registration event model (e.g., of aggregate models 444 of FIG. 4), which may process the risk scores and, optionally, entity-related auxiliary data (e.g., auxiliary data 466 of FIG. 4) to generate the situational exam registration event risk score. In an alternate embodiment, the exam registration event data, the candidate data, the test center data, and the exam data may be input directly into a situational exam registration event model to produce the situational exam registration event score without the intermediate determination of entity risk scores.

At step 616, the one or more processors (e.g., which may include a processor of a resource management server such as resource management server 402 of FIG. 4) may compare the situational exam registration event risk score to one or more predetermined situational exam registration event thresholds to determine whether the situational exam registration event risk score exceeds any such thresholds. If at least one threshold is exceeded, the method proceeds to step 618. Otherwise, the method proceeds to step 620.

At step 618, the one or more computer processors (e.g., which may include a processor of a resource management server such as resource management server 402 of FIG. 4) may take one or more predefined actions based on which threshold or thresholds were exceeded by the situational exam registration event risk score. For example, predefined actions that may be taken at this stage may include: requiring enhanced identity verification of the candidate at subsequent exam delivery, triggering a human investigation of the candidate and/or test center, preventing the candidate from registering for the exam, and/or preventing the candidate from using the system (examples of which are described above).

As an example of a predefined action that may be taken in response to determining that the situational exam delivery event risk score exceeds one or more thresholds, enhanced identity verification may be required before allowing the candidate to register for the and/or may be triggered when the candidate arrives at a test center to take an exam. The enhanced identity verification may involve two-factor identification, photograph identification requirements, and/or biometric analysis.

As an example of a predefined action that may be taken in response to determining that the situational exam delivery event risk score exceeds one or more thresholds, a human investigation may be triggered, which may involve sending relevant information (e.g., some or all of the candidate data, exam registration event data, exam data and/or test center data) to a human investigator. The investigator may then manually exonerate the candidate and/or test center or may limit or disable the candidate's access to the system based on their review of the information and/or may initiate an investigation into the testing center.

The investigation of a testing center may involve a so-called "secret shopper" investigation, in which an individual may pretend to register for and/or take an exam at the test center in order to collect information about the test center, such as whether the test center is facilitating cheating or other unfair or fraudulent practices. The results of the investigation may be added to the test center data for the test center. In some cases, the outcome of the investigation of the test center may result in the test center's certification being revoked, or may result in limitations being placed on the test center so that the test center is only authorized to deliver exams of particular types or categories.

If the predefined actions taken at step 618 result in the candidate being banned from the system or being disallowed from registering for the exam, the exam registration event and the method may end immediately. Otherwise, the method may proceed to step 621. It should be understood that a delay may occur before proceeding to step 621, as there will generally be a delay between a candidate registering for an exam and the exam being delivered to the candidate.

At step 620, the one or more processors (e.g., which may include a processor of a resource management server such as resource management server 402 of FIG. 4) may determine whether the exam registration event is complete (e.g., whether the candidate has successfully submitted their exam registration request). If the candidate was able to successfully register to take the exam, the method may proceed to step 622 of FIG. 6C via node B. Otherwise, the method returns to step 610 in order to retrieve relevant entity data (which may have been updated since the last time the relevant entity data was retrieved) and continue monitoring the exam registration event and periodically, updating, evaluating, and possibly taking action based on situational exam registration vent risk scores.

In some embodiments, as an example of a predefined action that may be taken in response to determining that a given candidate has a candidate risk score exceeding a corresponding threshold and/or is associated with an exam registration event risk score exceeding a corresponding threshold, the resource management server(s) 402 may update and/or otherwise modify one or more database entries of the risk management database with a recommendation including: an investigation to determine a performance score for each of the plurality of testing facilities, the investigation comprising registering an individual to take an exam at a test center associated with the exam registration event to collect information about the test center to determine whether the test center is facilitating cheating or other unfair or fraudulent practices In some embodiments, if the collected information about the test center determines that the test center is facilitating cheating or other unfair or fraudulent practices, the test center may: lose a certification or may be given at least one additional limitation on test administration of at least one exam of a particular type of category; be invalidated from giving one or more particular types or classes of examination; and/or may be required to gather more forms of identification from candidates taking exams at the location of that test center.

The flow chart of FIG. 6C depicts a portion of the method that may be performed during (and optionally, in part, after) the real-time exam delivery event state At step 621, the one or more computer processors (e.g., which may include a processor of a resource management server, such as resource management server 402 of FIG. 4) may identify that the state of the exam registration and delivery event process is presently the real-time exam delivery event state. For example, the one or more computer processors may receive a notification indicating that the exam registration and delivery event process has entered the real-time exam delivery event state. The notification may be generated in response to the initiation of the exam delivery event (e.g., based on the scheduled time of the exam delivery event that was defined in during previous exam registration event, and/or based on an indication received from a client device of a proctor administering the exam delivery event confirming that the candidate has arrived at the test center for the scheduled exam). The one or more computer processors may identify that relevant entity or entities for the exam delivery event state includes the candidate taking the exam, the exam being delivered to the candidate, the exam registration event during which the exam was registered for by the candidate, the test center at which the exam delivery event is occurring, the exam delivery event itself, and the proctor administering the exam delivery event.

At step 622, the one or more computer processors (e.g., which may include a processor of a model server such as model server 430 of FIG. 4) may retrieve candidate data, exam registration event data, test center data, exam data, and proctor data from respective data stores (e.g., data stores 412, 416, 418 of data store server 410 of FIG. 4). The retrieved data may correspond to entities associated with the particular exam delivery event for which risk assessment and response is being performed.

At step 624, the one or more computer processors (e.g., which may include a processor of a resource management server such as resource management server 402 of FIG. 4) may monitor the ongoing exam delivery event, and may store and/or update exam delivery event data in an exam delivery event data store (e.g., exam delivery event data store 420 of FIG. 4). While shown here to occur periodically, it should be understood that in some embodiments, this monitoring and updating step may occur continuously in parallel with steps 626-632 (e.g., until the exam delivery event ends) so that candidate, proctor, and test center behavior may be constantly monitored throughout the exam delivery event. In some embodiments, the frequency at which the respective monitoring and updating of the exam delivery event and exam delivery event data is performed may be set based on the situational exam delivery event risk score generated at step 626 (e.g., may be increased as the situational exam registration event risk score increases).

At step 626, the one or more processors (e.g., which may include a processor of a model server such as model server 430 of FIG. 4) process the exam registration event data, candidate data, exam data, exam delivery event data, proctor data, and/or test center data with one or more models to generate a situational exam delivery event risk score (e.g., aggregate risk score 464 of FIG. 4). For example, entity-level models (e.g., models 432, 434, 436, 438, 440, 442, 443 of FIG. 4) may separately process the exam registration event data, the candidate data, the test center data, and the exam data to respectively produce entity risk scores that may include: an exam registration event risk score (e.g., exam registration event risk score 454 of FIG. 4), a candidate risk score (e.g., candidate risk score 452 of FIG. 4), a test center risk score (e.g., test center risk score 456 of FIG. 4), an exam risk score (e.g., exam risk score 458 of FIG. 4), a country risk score (e.g., country risk score 463 of FIG. 4), an exam delivery event risk score (e.g., exam delivery event risk score 460 of FIG. 4), and/or a proctor risk score (e.g., proctor risk score 462 of FIG. 4). In some embodiments, one or more these risk scores may be generated prior to the performance of the method and/or of step 614 and, instead of being generated at this step, may be retrieved from a risk score data store (e.g., risk score data store 424 of FIG. 4).

The produced and/or retrieved risks scores may then be input to a situational exam delivery event model (e.g., of aggregate models 444 of FIG. 4), which may process the risk scores and, optionally, entity-related auxiliary data (e.g., auxiliary data 466 of FIG. 4) to generate the situational exam delivery event risk score. In an alternate embodiment, the exam registration event data, the candidate data, the test center data, the exam data, the exam delivery event data, and the proctor data may be input directly into a situational exam registration event model to produce the situational exam registration event score without the intermediate determination of entity risk scores.

At step 628, the one or more processors (e.g., which may include a processor of a resource management server such as resource management server 402 of FIG. 4) may compare the situational exam delivery event risk score to one or more predetermined situational exam delivery event thresholds to determine whether the situational exam delivery event risk score exceeds any such thresholds. If at least one threshold is exceeded, the method proceeds to step 630. Otherwise, the method proceeds to step 632.

At step 630, the one or more computer processors (e.g., which may include a processor of a resource management server such as resource management server 402 of FIG. 4) may take one or more predefined actions based on which threshold or thresholds were exceeded by the situational exam delivery event risk score. For example, predefined actions that may be taken at this stage may include: holding the candidate's score, requiring enhanced identity verification of the candidate at the end of exam delivery, triggering a human investigation of the candidate and/or test center, triggering advanced monitoring of the candidate while the exam delivery event is in progress, triggering active proctor review of a real-time video and/or audio feed of the candidate during the exam delivery event, and/or premature termination of the exam delivery event.

As an example of a predefined action that may be taken in response to determining that the situational exam delivery event risk score exceeds one or more thresholds, a hold may be placed on the candidate's score upon completion of the exam. When a hold is placed on a candidate's score, the candidate may be temporarily or permanently prevented from accessing the results of the exam they took during the exam delivery event. In some embodiments, the candidate may be notified that their score is being withheld (e.g., due to suspected cheating/fraud). For example, the notification may be displayed to the candidate via an electronic notification sent by the one or more processors to the computer device on which the candidate took the exam and may be displayed on a screen thereof.

As an example of a predefined action that may be taken in response to determining that the situational exam delivery event risk score exceeds one or more thresholds, enhanced identity verification may be required, for example, before allowing the candidate to receive their score on the exam and/or before allowing the candidate to leave the testing center. The enhanced identity verification may involve two-factor identification, photograph identification requirements, and/or biometric analysis. Candidate refusal to submit to the enhanced identity verification may result in the candidate's exam score being invalidated (e.g., by flagging or otherwise marking the candidate's exam results as invalid by the one or more computer processors). For embodiments in which a candidate is taking an exam remotely (e.g., from a home or personal computer), the candidate may be required to travel to a local testing center within a defined time period in order to verify their identity.

As an example of a predefined action that may be taken in response to determining that the situational exam delivery event risk score exceeds one or more thresholds, a human investigation may be triggered, which may involve sending relevant information (e.g., some or all of the candidate data, exam registration event data, exam data test center data, proctor data, and/or exam delivery event data) to a human investigator. The investigator may then manually exonerate the candidate and/or test center or may manually hold or invalidate the candidate's exam score, and/or may initiate an investigation into the testing center.

The investigation of a testing center may involve a so-called "secret shopper" investigation, in which an individual may pretend to register for and/or take an exam at the test center in order to collect information about the test center, such as whether the test center is facilitating cheating or other unfair or fraudulent practices. The results of the investigation may be added to the test center data for the test center. In some cases, the outcome of the investigation of the test center may result in the test center's certification being revoked, or may result in limitations being placed on the test center so that the test center is only authorized to deliver exams of particular types or categories.

As an example of a predefined action that may be taken in response to determining that the situational exam delivery event risk score exceeds one or more thresholds, advanced monitoring of the candidate while the exam delivery event is in progress may be triggered. For example, if the candidate's exam delivery event was originally not being monitored via video and/or audio recording, this triggering event may initiate such video/audio monitoring using video and/or audio recording devices, and the resulting video data and/or audio data may be stored as part of the exam delivery event data.

As an example of a predefined action that may be taken in response to determining that the situational exam delivery event risk score exceeds one or more thresholds, active proctor review of a real-time video and/or audio feed of the candidate during the exam delivery event may be triggered. For example, video and/or audio data may be captured of the candidate during the exam delivery event using video and/or audio recording devices, as indicated previously. In response to this trigger, video and/or audio data being captured in this way may be streamed in real-time to a proctor who may be on-site (at the testing center), or off-site (remote from the testing center). The proctor may also be provided with a notification as to why this referral for video and/or audio feed review of the exam delivery event is being requested (e.g., because the situational exam delivery event risk score exceeded one or more thresholds). In this way, human investigation of the exam delivery event may be initiated while the exam delivery event is still in progress.

As an example of a predefined action that may be taken in response to determining that the situational exam delivery event risk score exceeds one or more thresholds, the exam delivery event may be terminated prior to completion of the exam by the candidate.

At step 632, the one or more processors (e.g., which may include a processor of a resource management server such as resource management server 402 of FIG. 4) may determine whether the exam is over, either due to the candidate confirming that they have completed the exam, or due to premature termination of the exam delivery event at step 630. If the exam delivery event has not ended, the method returns to step 622, and retrieval of relevant entity data and monitoring of the exam delivery event continues. If the exam delivery event has, the method may end or may optionally proceed to step 634 before ending.

At step 634, the one or more processors (e.g., which may include a processor of a resource management server such as resource management server 402 of FIG. 4) may perform one or more post-examination actions based on which, if any, situational exam delivery event thresholds were exceeded by the situational exam delivery event risk score. For example, post-examination actions may include the triggering of a human investigation into the candidate and/or test center and/or placing a hold on the candidate's exam score.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a data store coupled to a computer network and storing:
 a plurality of entity data associated with an anticipated testing activity comprising:
  an exam data;
  a test center data associated with a test center at which the anticipated testing activity will occur;
  a candidate data associated with:
   each of a plurality of candidates anticipated to be involved in the anticipated testing activity; and
   a historical testing data associated with each of the plurality of candidates;
  a country data; and
  a proctor data;
 a plurality of machine learning models including a set of entity-level machine learning models and an aggregate machine learning model, wherein the set of entity-level machine learning models includes a candidate machine learning model, a test center machine learning model, an exam machine learning model, a proctor machine learning model, and a country machine learning model, wherein the set of entity-level machine learning models are trained via machine learning to generate entity-level risk scores for corresponding entity data types;
 a plurality of recommended predefined actions; and
 a threshold representing a desired level of trustworthiness which, when exceeded by an anticipated situational risk score, triggers a recommendation for at least one recommended predefined action in the plurality of recommended predefined actions; and
a server comprising a server hardware computing device coupled to a network and including one or more electronic processors executing instructions within a memory that, when executed, cause the system to:
 receive, from the data store, the threshold;
 select, from the data store, at least one entity-level machine learning model from the set of entity-level machine learning models and an entity data from the plurality of entity data, associated with the anticipated testing activity, wherein the at least one entity-level machine learning model corresponds to the entity data;
 perform, prior to the anticipated testing activity, a risk assessment of the entity data, indicating a risk level associated with the anticipated testing activity and comprising:
  applying the at least one entity-level machine learning model to at least a portion of the entity data to generate a set of entity-level risk scores, wherein the set of entity-level risk scores includes at least one of a candidate risk score, an exam risk score, or a test center risk score;
  applying the aggregate machine learning model to the set of entity-level risk scores to generate the anticipated situational risk score; and
  comparing the anticipated situational risk score to the threshold; and
 responsive to the anticipated situational risk score exceeding the threshold, update, prior to the anticipated testing activity, a database entry associated in the data store with the entity data to trigger a fraud investigation of at least one entity associated with the entity data as the at least one recommended predefined action in the plurality of recommended predefined actions, the at least one recommended predefined action providing a level of trustworthiness at least as high as the desired level of trustworthiness represented by the threshold.

2. The system of claim 1, further comprising a distributed computing system including a plurality of data repositories connected to the data store through the computer network, wherein:
the plurality of entity data is distributed among the data store and the plurality of data repositories; and
the plurality of data repositories are operated by:
 an administrative entity operating the system;
 a testing facility; or
 a trusted third party.

3. The system of claim 1, wherein the at least one entity-level machine learning model is trained via a linear regression analysis or a classification training.

4. The system of claim 3, further comprising a neural network used by the at least one entity-level machine learning model, wherein the neural network includes a plurality of nodes configured to perform the linear regression analysis.

5. The system of claim 4, further comprising a plurality of known-good testing activity data and a plurality of known-bad testing activity data stored in the data store, wherein the neural network performs the linear regression analysis using a plurality of samples from the plurality of known-good testing activity data.

6. A method comprising:
receiving, by a server comprising a server computing device coupled to a computer network and including a processor executing instructions within a memory, a threshold representing a desired level of trustworthiness for an anticipated testing activity which, when exceeded by an anticipated situational risk score, triggers a recommendation for at least one recommended predefined action in a plurality of recommended predefined actions stored in a data store coupled to the computer network;
selecting, by the server from the data store, at least one entity data associated with the anticipated testing activity, the at least one entity data being selected from a plurality of entity data stored in the data store and comprising:
an exam data;
a test center data associated with a test center at which the anticipated testing activity will occur;
a candidate data associated with:
each of a plurality of candidates anticipated to be involved in the anticipated testing activity; and
a historical testing data associated with each of the plurality of candidates;
a country data; and
a proctor data;
performing, by the server, a risk assessment of each of the at least one entity data prior to the anticipated testing activity, indicating a risk level associated with the anticipated testing activity, and comprising:
selecting, from the data store, at least one entity-level machine learning model from a set of entity-level machine learning models stored in the data store, wherein the set of entity-level machine learning models includes a candidate machine learning model, a test center machine learning model, an exam machine learning model, a proctor machine learning model, and a country machine learning model, wherein the at least one entity-level machine learning model is trained via machine learning to generate an entity-level risk score for corresponding entity data types, wherein the at least one entity-level machine learning model corresponds to the at least one entity data;
applying the at least one entity-level machine learning model to the at least one entity data to generate a set of entity-level risk scores, wherein the set of entity-level risk scores includes at least one of a candidate risk score, an exam risk score, or a test center risk score;
applying an aggregate machine learning model stored in the data store to the set of entity-level risk scores to generate the anticipated situational risk score; and
comparing the anticipated situational risk score to the threshold; and
responsive to the anticipated situational risk score exceeding the threshold, updating, prior to the anticipated testing activity, by the server, a database entry, associated in the data store with the at least one entity data, to trigger a requirement for enhanced identity verification of the candidate at an exam delivery event for the anticipated testing activity as the at least one recommended predefined action in the plurality of recommended predefined actions, the at least one recommended predefined action providing a level of trustworthiness at least as high as the desired level of trustworthiness represented by the threshold.

7. The method of claim 6, wherein the exam data comprises:
an exam type for an exam associated with the anticipated testing activity;
a stakes rating for the exam;
an item bank size for an item bank associated with the exam;
a refresh rate for the item bank;
an item bank age for the item bank;
a delivery mechanism for the exam; and
at least one web monitoring result, indicating whether an exam content for the exam has been published online.

8. The method of claim 6, wherein the test center data is selected from the group consisting of:
a name of the test center associated with, and anticipated to be used during, the anticipated testing activity;
a facility type of the test center;
at least one anticipated identification requirement at the test center;
a country or other geographical location associated with the test center, or in which the test center resides;
an age of the test center;
an IP address associated with the test center;
a geolocation of the test center, based on the IP address;
an exam registration history for the test center;
a software update compliance indicator for the test center;
an exam result pattern indicator for the test center;
a registration pattern indicator for the test center;
a geolocation mismatch indicator for the test center; and
a number of test centers located within a predefined radius from the test center.

9. The method of claim 6, wherein the candidate data is selected from the group consisting of:
a name of a candidate associated with, and anticipated to be involved with, the anticipated testing activity;
an email address of the candidate;
a country of residence of the candidate;
a third-party demographic data associated with the candidate;
an Internet Protocol (IP) address associated with a user device operated by the candidate, the IP address being determined by a geolocation of the user device;
a bot behavior indicator associated with the IP address;
a historical fraudulent behavior indicator associated with the candidate;
an account takeover risk indicator associated with the candidate, the account takeover risk indicator being based on an account activity of a user profile associated with the candidate;
an age of the user profile associated with the candidate; and
an exam registration history associated with the candidate.

10. The method of claim 9, wherein the candidate data further comprises an anticipated class of candidates, according to:
an anticipated age range of at least one candidate anticipated to be involved with the anticipated testing activity;
an anticipated country of origin for the at least one candidate; and at least one anticipated background of the at least one candidate, including:
    at least one prior exam taken by the at least one candidate; and
    a pass/fail rate of the at least one candidate.

11. The method of claim 6, wherein the country data is selected from the group consisting of:
    a candidate country in which a candidate associated with the anticipated testing activity is located;
    an anticipated testing activity country in which the anticipated testing activity is located; and
    a plurality of zones associated with the anticipated testing activity, and further associated with at least one legal restriction for the anticipated testing activity.

12. The method of claim 6, wherein the proctor data is selected from the group consisting of:
    an employment type indicator indicating whether a proctor associated with the entity data is an employee of a test center associated with the anticipated testing activity, or is a contractor;
    a history of exams supervised by the proctor;
    a total number of years that the proctor has been supervising exam delivery;
    an employment history of the proctor;
    a proctor fraud history indicating whether the proctor is associated with at least one previous incident of fraud;
    a certification status of the proctor; and
    at least one certification exam result for the proctor.

13. A system comprising a server, comprising a server computing device coupled to a computer network and including at least one processor executing instructions within a memory which, when executed, cause the system to:
    receive a threshold representing a desired level of trustworthiness for an anticipated testing activity which, when exceeded by an anticipated situational risk score, triggers a recommendation for at least one recommended predefined action in a plurality of recommended predefined actions stored in a data store coupled to the computer network;
    select, from the data store, at least one entity data associated with the anticipated testing activity, the at least one entity data being selected from a plurality of entity data stored in the data store and comprising:
        an exam data;
        a test center data associated with a test center at which the anticipated testing activity will occur;
        a candidate data associated with:
            each of a plurality of candidates anticipated to be involved in the anticipated testing activity; and
            a historical testing data associated with each of the plurality of candidates;
        a country data; and
        a proctor data;
    perform, prior to the anticipated testing activity, a risk assessment of each of the at least one entity data, indicating a risk level associated with the anticipated testing activity, and comprising:
        selecting, from the data store, at least one entity-level machine learning model from a set of entity-level machine learning models stored in the data store, wherein the set of entity-level machine learning models includes a candidate machine learning model, a test center machine learning model, an exam machine learning model, a proctor machine learning model, and a country machine learning model, wherein the at least one entity-level machine learning model is trained via machine learning to generate an entity-level risk score for a corresponding entity data types, wherein the at least one entity-level machine learning model corresponds to the at least one entity data;
        applying the at least one entity-level machine learning model to the at least one entity data to generate a set of entity-level risk scores, wherein the set of entity-level risk scores includes at least one of a candidate risk score, an exam risk score, or a test center risk score;
        applying an aggregate machine learning model stored in the data store to the set of entity-level risk scores to generate the anticipated situational risk score; and
        comparing the anticipated situational risk score to the threshold; and
    responsive to the anticipated situational risk score exceeding the threshold, updating, prior to the anticipated testing activity, by the server, a database entry, associated in the data store with the at least one entity data, to cause a live video feed of an exam delivery event for the anticipated testing activity to be sent to a proctor as the at least one recommended predefined action in the plurality of recommended predefined actions, the at least one recommended predefined action providing a level of trustworthiness at least as high as the desired level of trustworthiness represented by the threshold.

14. The system of claim 13, wherein the server is further configured, responsive to the anticipated situational risk score exceeding the threshold, to automatically update the database entry to include a recommendation for:
    a specific class of testing center for the anticipated testing activity; or
    a reduction to a number of testing centers, according to a geographic region or the specific class of testing centers, for the anticipated testing activity.

15. The system of claim 13, wherein the server is further configured, responsive to the anticipated situational risk score exceeding the threshold, to automatically update the database entry to include a recommendation for at least one identification check protocol.

16. The system of claim 15, wherein the at least one identification check protocol comprises:
    a first requirement for a photo identification for a candidate associated with the anticipated testing activity;
    a second requirement for at least two forms of identification for the candidate; or
    an ongoing identification validation during the anticipated testing activity.

17. The system of claim 13, wherein the server is further configured, responsive to the anticipated situational risk score exceeding the threshold, to automatically update the database entry to include at least one recommendation for at least one proctor solution comprising:
    an increased ratio of human proctors to a plurality of candidates associated with the anticipated testing activity; or
    a use or non-use of an automated proctoring solution.

18. The system of claim 13, wherein the server is further configured, responsive to the anticipated situational risk score exceeding the threshold, to automatically update the database entry to include a recommendation for storing captured data comprising a video or audio data during the anticipated testing activity.

19. The system of claim 13, wherein the server is further configured, responsive to the anticipated situational risk score exceeding the threshold, to automatically update the database entry to include a recommendation for an increased security for an administration of the anticipated testing activity, the increased security addressing:
- a high risk of an intellectual property associated with an exam being stolen; and
- at least one instance of anticipated cheating during the anticipated testing activity.

20. The system of claim 13, wherein the server is further configured, responsive to the anticipated situational risk score exceeding the threshold, to automatically update the database entry to include a recommendation for a change to a format for the exam data including:
- increasing a total number of exam questions within an exam bank; and
- a modification to a delivery mode for the exam data.

* * * * *